United States Patent [19]

Morikawa et al.

[11] Patent Number: 5,642,705
[45] Date of Patent: Jul. 1, 1997

[54] CONTROL SYSTEM AND METHOD FOR DIRECT FUEL INJECTION ENGINE

[75] Inventors: Koji Morikawa; Akira Akimoto, both of Tokyo-To, Japan

[73] Assignee: Fuji Jukogyo Kabushiki Kaisha, Tokyo, Japan

[21] Appl. No.: 535,636

[22] Filed: Sep. 28, 1995

[30] Foreign Application Priority Data

Sep. 29, 1994 [JP] Japan .................................. 6-235690
Dec. 22, 1994 [JP] Japan .................................. 6-319917
Sep. 13, 1995 [JP] Japan .................................. 7-235727

[51] Int. Cl.[6] .............................. F01N 3/02; F02B 3/04; F02D 41/40; F02D 43/04
[52] U.S. Cl. .............................. 123/300; 60/285
[58] Field of Search .............................. 123/27 R, 299, 123/300, 305, 295, 424, 435; 60/284, 285

[56] References Cited

U.S. PATENT DOCUMENTS

| | | | |
|---|---|---|---|
| 2,917,031 | 12/1959 | Nestorovic | 123/299 |
| 4,452,040 | 6/1984 | Kobashi | 60/285 |
| 4,709,547 | 12/1987 | Pischinger et al. | 60/285 |
| 4,913,113 | 4/1990 | Baranescu | 123/300 |
| 5,460,128 | 10/1995 | Kruse | 123/299 |
| 5,482,017 | 1/1996 | Brehob et al. | 123/299 |

*Primary Examiner*—Willis R. Wolfe
*Attorney, Agent, or Firm*—Beveridge, DeGrandi, Weilacher & Young, L.L.P.

[57] ABSTRACT

In a catalyst activation control system for a direct fuel injection engine for igniting primary fuel injected into each cylinder, an additional fuel is injected at least once into each cylinder from an early period to a middle period of an expansion stroke of the primary fuel combustion in accordance with the engine operating conditions, to fire the additional injection fuel by flame propagation of the preceding fuel combustion (without re-ignition) for eliminating misfire, so that an exhaust gas temperature can be raised stably to activate catalyst for purification of exhaust gas. Further, any one of the additional fuel injection method and an ignition timing retarding method can be appropriately selected in accordance with the engine operating conditions for economization of fuel. Further, whenever a quantity of heat generated by the primary fuel combustion is not large enough to fire the additional injection fuel, any one of a method of changing a stratification combustion to a uniform combustion, a method of increasing the first fuel injection amount, and a method of interrupting the additional fuel injection can be selected appropriately for protectiing the catalyst.

41 Claims, 24 Drawing Sheets

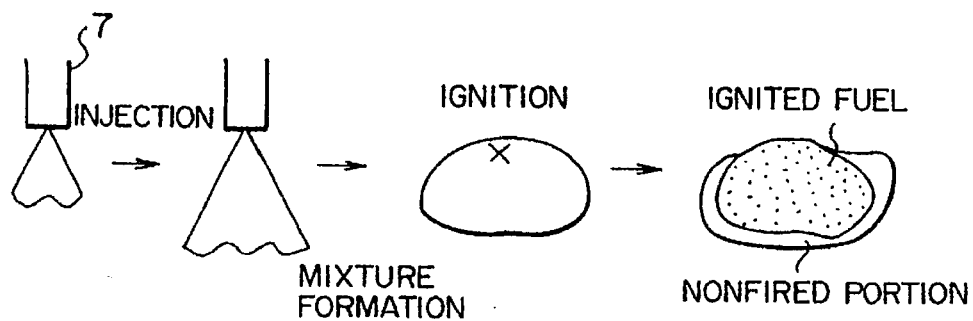
FIG. 1
PRIOR ART
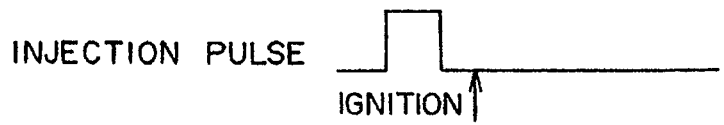
FIG. 2A
PRIOR ART
FIG. 2B
PRIOR ART
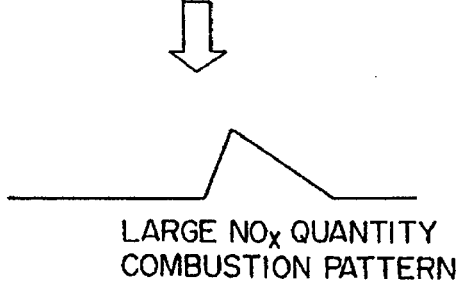
FIG. 2C
PRIOR ART

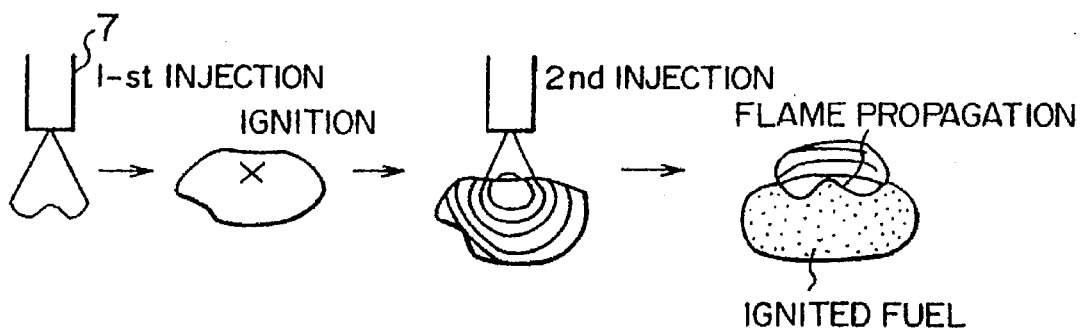
FIG.3
FIG.4A  INJECTION PULSE 
FIG.4B  GENERATED HEAT 

LOW NOx QUANTITY COMBUSTION PATTERN

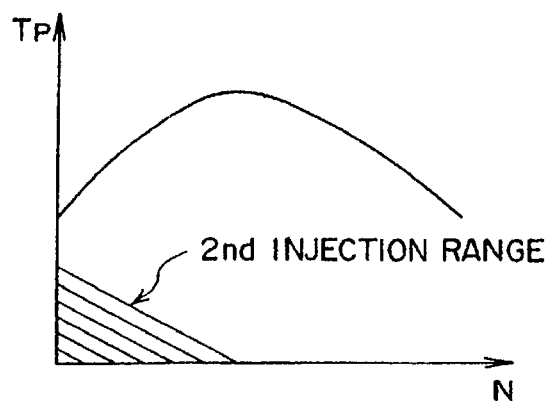
FIG.7
FIG.8A
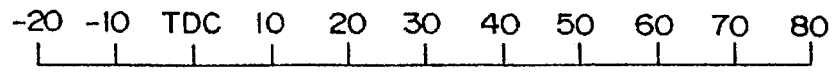
FIG.8B
FIG.8C
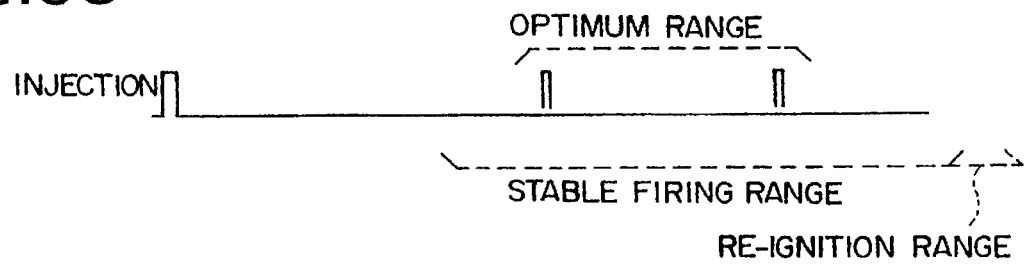

2nd INJECTION START TIMING (ATDC)

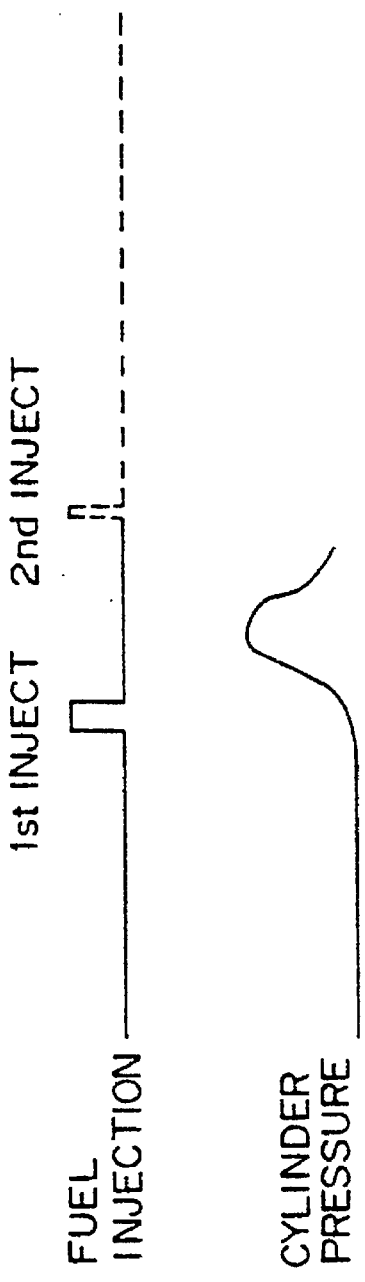
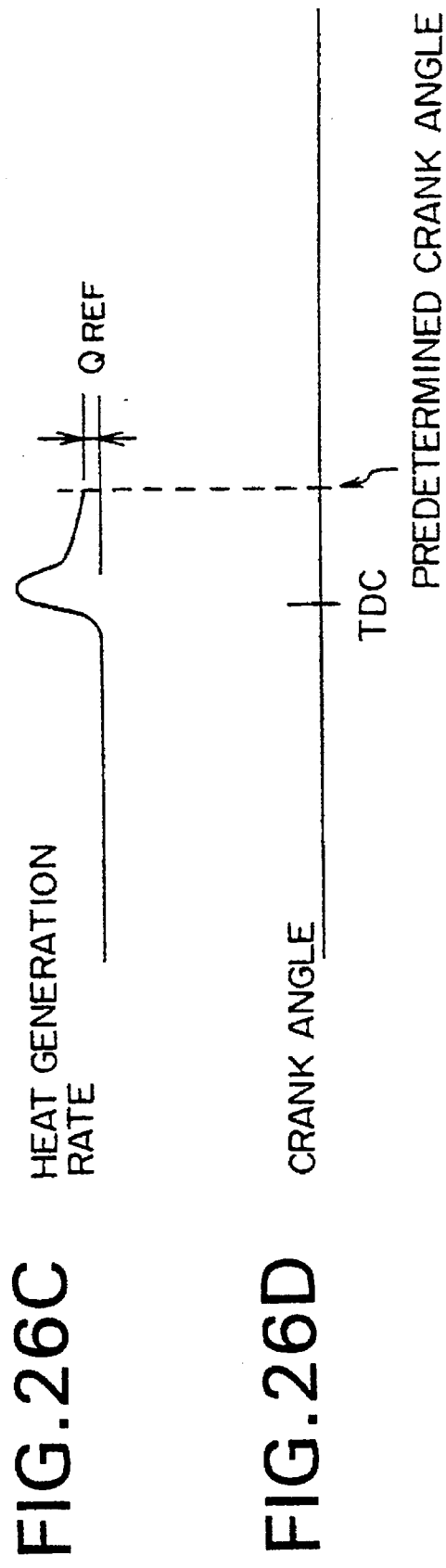
FIG.26A FUEL INJECTION — 1st INJECT, 2nd INJECT
FIG.26B CYLINDER PRESSURE
FIG.26C HEAT GENERATION RATE — Q REF
FIG.26D CRANK ANGLE — TDC, PREDETERMINED CRANK ANGLE

CONTROL SYSTEM AND METHOD FOR DIRECT FUEL INJECTION ENGINE

BACKGROUND OF THE INVENTION

The present invention relates to a catalyst activation control system and method for a direct fuel injection engine, and more specifically to a system and a method of activating catalyst disposed in an engine exhaust system by increasing exhaust gas temperature even if the air-fuel ratio of mixture is low. Here, in the direct fuel injection engine, fuel is directly injected (without being mixed with air before induced into each cylinder) into each cylinder and then ignited by spark ignition, respectively.

In the engine in which fuel is directly injected into each cylinder and then ignited by spark ignition, stratified combustion method is generally adopted. In this combustion method, the fuel is injected into each cylinder in the later half period of the compression stroke so that mixture of fuel and air can be stratified and further only a relatively rich mixture in the vicinity of an ignition plug can be ignited, with the result that the engine can be driven in a very lean air-fuel ratio to realize a low fuel consumption.

In the stratification combustion method, however, the mixture formation is severely affected by the fuel atomizing characteristics such as atomization rate and atomization angle of the fuel injector. In more details, FIG. 1 shows the combustion process in the single fuel injection. As shown in FIG. 1, when the atomized fuel is injected at a wide angle, since the outermost gas is excessively lean, even when spark ignited, the outermost fuel cannot be ignited perfectly, so that there inevitably exists a non-combustion region. As a result, the concentration of hydrocarbon (HC) increases in the exhaust gas. Further, FIG. 2 shows the relationship between the heat generation pattern and $NO_x$ generation rate, in the single fuel injection. As shown in FIG. 2, when the amount of the fuel injection is excessively large, the heat generation rate tends to increase in the first half of the combustion, with the result that the gas ignited in the first half is compressed in the second half and thereby nitrogen oxide $NO_x$ tends to be generated in the exhaust gas. This is because the initial combustion becomes active.

Further, in the above-mentioned stratified combustion method of the mixture, the exhaust gas temperature is largely reduced, as compared with the ordinary uniform combustion method. This is because the thermal efficiency is high and thereby the thermal loss is low and in addition the quantity of air heated per unit fuel is large in the stratified combustion. Consequently, the exhaust gas temperature becomes lower than a lower limit of the catalyst activation temperature (which is usually determined on the basis of the exhaust gas temperature of the conventional uniform combustion engine), in particular in a low-load engine driving range such as idling. As a result, there exists such a possibility that the performance of exhaust gas purification deteriorates.

To cope with this problem (i.e., to increase the exhaust gas temperature), Japanese Patent Application laid-open (Kokai) No. 4-183922(1992) discloses such a catalyst activation method that fuel is injected again in the expansion or exhaust stroke of the engine (i.e., the twice fuel injections), in addition to the ordinary single fuel injection, in order to raise the exhaust gas temperature by re-igniting the secondly injected fuel, for activation of the catalyst.

In the above-mentioned prior art method, however, since the fuel is injected and ignited twice for each engine cycle, there exist problems in that the ignition energy consumption not only increases, but also that the possibility of misfire is high in the second ignition.

The reason is as follows:

Since the second fuel is re-injected in the expansion or exhaust stroke and then re-ignited in the exhaust stroke after the primary combustion by the first fuel injection and ignition has been completed, there inevitably exists a time interval between the first primary fuel combustion and the second subsidiary fuel combustion.

Accordingly, it is difficult to form an ignitable mixture in the vicinity of the ignition plug due to a drop in the exhaust gas temperature. That is, it is difficult to well control the second fuel combustion.

In the above-mentioned case, if the second injection fuel is not ignited (the abnormal combustion) the durability of catalyst not only deteriorates markedly, but also the exhaust emission performance is degraded markedly. This is because fuel itself is emitted as it is.

In addition, since the exhaust gas temperature cannot be increased sufficiently high by only the twice fuel injections when the engine is started at a low temperature, it is impossible to activate the catalyst at an early stage. On the other hand, it is not advantageous to always inject fuel twice, from the standpoint of fuel consumption, when the target exhaust gas temperature is determined relatively low according to the engine operating conditions.

SUMMARY OF THE INVENTION

With these problems in mind, therefore, it is an object of the present invention to provide a catalyst activation control system for a direct fuel injection engine, by which twice or more fuel combustion can be realized securely to raise the exhaust gas temperature for catalyst activation, without depending upon re-ignition.

Further, another object of the present invention is to provide a combustion control method for a direct fuel injection engine, by which the non-combustion region of the outermost atomized mixture can be eliminated by improving the combustion controllability in a mixture of lean air-fuel ratio, in order to improve the combustion efficiency and the exhaust gas emission.

Further, the other object of the present invention is to provide a catalyst activation control system for a direct fuel injection engine, by which the catalyst can be activated at an early stage, while keeping the fuel consumption rate as low a level as possible.

A further object of the present invention is to provide a combustion control method for a direct fuel injection engine, by which the catalyst can be protected from deterioration, even in case of the abnormal combustion of the primary or preceding injection fuel, while preventing the exhaust gas emission from being degraded markedly.

To achieve the above-mentioned objects, the present invention provides a catalyst activation control system for a direct fuel injection engine, comprising: engine operating condition detecting means (3, 12, 13, 15, 16,) for detecting various engine operating conditions; first fuel combustion means (14, 51, 52, 53, 54, 55, 56, 57, 58, 7, 11; 54A, 55A, 61A) for spark-igniting first fuel directly injected into each of engine cylinders according to detected engine operating conditions; and catalyst activating means (61, 62, 63; 54A, 55A, 61A) for injecting an additional fuel at least once into each of the engine cylinders from an early period to a middle period of an expansion stroke of the preceding fuel combustion according to the engine operating conditions, to fire the additional injection fuel by flame propagation of the preceding fuel combustion so that an exhaust gas temperature can be raised for catalyst activation.

Here, the engine operating condition detecting means comprises: an air flow meter (3) for detecting a flow rate of air introduced into the cylinder; a throttle opening rate sensor (12) for detecting an opening rate of a throttle; a crank angle sensor (13) for detecting crank angular positions; a coolant temperature sensor (15) for detecting coolant temperature; and an exhaust gas temperature sensor (16) for detecting exhaust gas temperature.

Further, the first fuel combustion means comprises: a cylinder discriminate sensor (14) for discriminating each cylinder; a injector (7) for injecting fuel into each cylinder; a fuel ignitor (11) for igniting the fuel injected into each cylinder; engine speed calculating means (51) for calculating engine revolution speed (N) on the basis of signals outputted by said crank angle sensor (13); crank position detecting means (52) for detecting crank angular positions for each cylinder; operating condition detecting means (53) for calculating a basic fuel injection amount ($T_p = K \times Q/N$), as engine load, on the basis of the engine operating conditions (Q, N) detected by said engine operating condition detecting means and a correction constant (K) determined for said fuel injector (7), to decide any one of an ordinary uniform combustion for injecting fuel in an early period of an engine intake stroke and a stratified combustion for injecting fuel in a later half period of the compression stroke but immediately before fuel spark ignition; first fuel injection amount setting means (54, 54A) for setting a first fuel injection amount ($T_{i1} = T_p \times COEF \times T_s$) by correcting a basic fuel injection amount ($T_p$) calculated by said operating condition detecting means (53) on the basis of a coefficient (COEF) determined according to the current engine operating conditions detected by said engine operating condition detecting means and a voltage correction rate ($T_s$) determined on the basis of a battery voltage ($V_B$); first fuel injection timing setting means (55, 55A) for setting a first fuel injection timing ($T_{INJ1}$) according to the combustion mode decided by the operating condition detecting means (53) and the detected engine operating conditions (N, $T_p$); ignition timing setting means (56) for setting an ignition timing ($\theta_{IG}$) by correcting a basic ignition timing ($\theta_{BASE}$) decided by the detected engine operating conditions (N, $T_p$, coolant temp); fuel injection timing calculating means (57) for calculating the set fuel injection timing in terms of a crank angular position relative to a reference crank angle, and outputting the calculated fuel injection timing signal to the injector (7); and ignition timing calculating means (58) for calculating the set fuel ignition timing in terms of a crank angular position relative to the reference crank angle position, and outputting the calculated fuel ignition timing signal to the ignitor (11).

In the first embodiment of the catalyst activation control system according to the present invention, the catalyst activating means comprises: second fuel injection discriminating means (61) for discriminating whether the current operating conditions lie within a range where a second fuel injection is necessary or not on the basis of the detected engine operating conditions and for outputting a command indicative of a second fuel injection; second fuel injection amount setting means (62) responsive to the second fuel injection command for setting a second fuel injection amount ($T_{i2}$) fired by the flame propagation of the first fuel combustion, the set second fuel injection amount ($T_{i2}$) being applied to the fuel injection timing calculating means (57); and second fuel injection timing setting means (63) responsive to the second fuel injection command for setting a second fuel injection timing ($T_{INJ2}$), the set second fuel injection timing ($T_{INJ2}$) being applied to said fuel injection timing calculating means (57).

Further, in the second embodiment of the catalyst activation control system according to the present invention, the catalyst activating means comprises: fuel injection discriminating means (61A) for discriminating whether the current operating conditions lie within a range where a plurality of fuel injections are necessary or not on the basis of engine speed (N) and the engine load represented by the calculated basic fuel injection amount ($T_p$) and for outputting a command indicative of plural fuel injections; plural fuel injection amount setting means (54A) responsive to the plural fuel injection command, for setting a plurality of fuel injection amounts ($T_{i2}$, $T_{i3}$, . . . ) fired by the flame propagation of the preceding fuel combustion, a plurality of the set fuel injection amounts ($T_{i2}$, $T_{i3}$, . . . ) being applied to said fuel injection timing calculating means (57), the plural fuel injection amount setting means (54A) being incorporated in the first fuel injection amount setting means (54); and plural fuel injection timing setting means (55A) responsive to the plural fuel injection command, for setting a plurality of fuel injection timings ($T_{INJ2}$, $T_{INJ3}$, . . . ), a plurality of the set fuel injection timings ($T_{INJ2}$, $T_{INJ3}$, . . . ) being applied to the fuel injection timing calculating means (57), the plural fuel injection timing setting means (55A) being incorporated in the first fuel injection timing setting means (55).

Further, in the third embodiment of the catalyst activation control system according to the present invention, the system further comprises, in addition to the first embodiment, target exhaust gas temperature setting means (71), when the second fuel injection discriminating means (61) discriminates that the engine operating conditions lie in a range where the catalyst cannot be activated, for setting a target exhaust gas temperature; temperature rasing method selecting means (72) for selecting any one of a twice fuel injection method and an ignition timing retard method according to the set target exhaust gas temperature under consideration of fuel consumption rate; and ignition timing retarding means (73) for retarding the ignition timing decided by the ignition timing setting means (56).

Further, in the fourth embodiment of the catalyst activation control system according to the present invention, the system further comprises, in addition to the third embodiment, an exhaust gas temperature sensor (16); comparing means (74) for comparing the target exhaust gas temperature set by the target exhaust gas setting means (71) with an actual exhaust gas temperature detected by the exhaust gas sensor (16); and the second fuel injection amount setting means (62) and the ignition timing retarding means (73) adjusting the second fuel injection amount ($T_{i2}$) and the ignition timing retard rate ($\theta_{RD}$), respectively on the basis of the difference between the target exhaust gas temperature and an actual exhaust gas temperature under feedback control.

Further, in the fifth embodiment of the catalyst activation control system according to the present invention the system further comprises, in addition to the third embodiment, an exhaust gas temperature sensor (16); catalyst activation discriminating means (75) for discriminating whether the exhaust gas temperature reaches a temperature at which the catalyst can be activated, on the basis of an actual temperature detected by the exhaust gas temperature sensor; third fuel injection amount setting means (76) for setting a third fuel injection amount; and third fuel injection timing setting mans (77) for setting the third fuel injection timing according to the target exhaust gas temperature.

Further, in the sixth embodiment of the catalyst activation control system according to the present invention, the system further comprises, in addition to the first embodiment, cylinder pressure detecting means (64) for detecting a cylinder pressure generated by the first fuel combustion; heat generation rate calculating means (65) for calculating heat generated by the first fuel combustion on the basis of the detected cylinder pressure and the crank angular position detected by the crank angle sensor (13); abnormality discriminating section (66) for discriminating whether the first fuel combustion is normal or not on the basis of the calculated heat generation rate; and combustion mode changing means (67), when the abnormality discriminating section (66) outputs an abnormality signal, for changing the stratified combustion to the uniform combustion.

Further, in the seventh embodiment of the catalyst activation control system according to the present invention, the system further comprises, in addition to the first embodiment, cylinder pressure detecting means (64) for detecting a cylinder pressure generated by the first fuel combustion; heat generation rate calculating means (65) for calculating heat generated by the first fuel combustion on the basis of the detected cylinder pressure and the crank angle detected by the crank angle sensor (13); abnormality discriminating section (66) for discriminating whether the first fuel combustion is normal or not on the basis of the calculated heat generation rate; first fuel correcting parameter selecting means (81), when the abnormality discriminating section (66) outputs an abnormality signal, for setting at least one parameter for correcting the first fuel combustion; and first fuel correcting parameter setting section (82) for setting the selected parameter to the first fuel injection amount setting means (54), the first fuel injection timing setting means (55) and the ignition timing setting means (56), respectively, to increase the heat generation rate by the first fuel combustion in the succeeding cycle, respectively without changing the combustion mode from the stratification combustion to the uniform combustion.

Further, the present invention provides a catalyst activation control system for a direct fuel injection engine for spark-igniting first fuel directly injected into each of engine cylinders, while purifying exhaust gas by a catalyst disposed in an engine exhaust system, wherein an additional fuel is injected at least once into each of the engine cylinders from an early period to a middle period of an expansion stroke of the first fuel combustion according to the engine operating conditions, to fire the additional injection fuel by flame propagation of the preceding fuel combustion so that an exhaust gas temperature can be raised for catalyst activation.

Further, it is preferable that any one of the additional fuel injection method and an ignition timing retarding method is selectively selected according to the engine operating conditions. Further, it is preferable that when a quantity of heat generated by the first fuel combustion is not large enough to fire the additional injection fuel, any one of a method of changing a stratified combustion to a uniform combustion, a method of increasing the first fuel injection amount, and a method of interrupting the additional fuel injection is selectively selected.

Further, the first embodiment of the present invention provides a method of activating catalyst for a direct fuel injection engine, which comprises a first fuel injection setting process and a second fuel injection setting process including the steps of: detecting engine operating parameters (S102); calculating a basic fuel injection amount ($T_p$) on the basis of the detected engine operating parameters (S101); setting a first fuel injection amount ($T_{i1}$) by correcting the basic fuel injection amount ($T_p$) on the basis of various engine operating conditions (S103, S104, S105); setting a first fuel injection timing ($T_{INJ1}$) (S106); checking whether a second fuel injection is needed or not (S152); setting a second fuel injection amount ($T_{i2}$) (S153) when judged the second fuel injection is needed; and setting a second fuel injection timing ($T_{INJ2}$) between 30 and 60 degrees in crank angular position after top dead center (S154).

Further, the second embodiment of the present invention provides a method of activating catalyst for the direct fuel injection engine, which comprises a first fuel injection setting process and an n-time fuel injection setting process including the steps of: detecting engine operating parameters (S51); calculating a basic fuel injection amount ($T_p$) on the basis of the detected engine operating conditions (S51); checking whether n-time fuel injection is needed or not (S52); setting a first fuel injection amount ($T_1$) by correcting the basic fuel injection amount ($T_p$) on the basis of various engine operating conditions (S53) when n-time fuel injection is not needed and further setting a first fuel injection timing ($T_{INJ1}$) (S54); and setting a first fuel injection amount ($T_{i1}$) when the n-time fuel injection is needed, a second fuel injection amount ($T_{i2}$), a third fuel injection amount ($T_{i3}$), . . . (S55), in sequence; and further setting a first injection timing ($T_{INJ1}$), a second fuel injection timing ($T_{INJ2}$), a third fuel injection timing ($T_{INJ3}$), . . . (S56), in sequence.

Further, the third embodiment of the present invention further comprises, in addition to the steps of the first embodiment, an ignition timing retarding process including the steps of: detecting engine operating conditions (N, $T_p$) (S201); checking whether exhaust gas temperature raising conditions are satisfied or not (S202); setting a target exhaust gas temperature with reference to a map and on the basis of the detected engine operating conditions (N, $T_p$) (S203) when the temperature raising conditions are satisfied; checking whether the target exhaust gas temperature is 300° C. or higher (S204); selecting twice fuel injection and set the second fuel injection amount $T_{i2}$ (S206) and the second fuel injection timing $T_{INJ2}$ (S207) when the temperature is 300° C. or higher; and selecting an ignition retard (S208) and set an ignition timing retard angle $\theta_{RD}$ (S209) when the temperature is lower than 300° C.

Further, the fourth embodiment of the present invention further comprises, in addition to the steps of the third embodiment, a feedback control process including the steps of: checking whether exhaust gas temperature raising is executed or not (S301); measuring an exhaust gas temperature (S302) when the temperature raising is executed; checking whether the measured exhaust gas temperature reaches the target exhaust gas temperature (S303); checking whether the twice fuel injection or not (S304) when the gas temperature does not reach the target temperature; increase the second fuel injection amount (S305) when the gas temperature reaches the target temperature; and increase the ignition timing retard angle $\theta_{RD}$ (S306) when the gas temperature does not reach the target temperature.

Further, the fifth embodiment of the present invention further comprises, in addition to the steps of the first embodiment, an exhaust gas temperature raising process including the steps of: detecting engine operating conditions (S401); detecting coolant temperature (S402); checking whether engine is being started (S403); set a target exhaust gas temperature (S404) when the engine is started; checking whether the set exhaust gas temperature is 400° C. or higher (S405); setting a second injection fuel amount ($T_{i2}$) and a third injection fuel amount ($T_{i3}$) (S412) when the temperature is 400° C. or higher; and setting a second injection fuel timing ($T_{INJ2}$) and a third injection fuel timing ($T_{INJ3}$) (S413).

Further, an exhaust gas temperature raising process further includes the steps of: in the step of checking whether the engine is being started (S403) when the engine is not started, setting another target exhaust gas temperature (S414); checking whether thrice fuel injection is necessary (S415); setting the thrice fuel injection amount ($T_{i3}$) and timing ($T_{INJ3}$) (S412, S413) when the engine is started; selecting the twice fuel injection (S407) when the engine is not started; and setting only the second fuel injection amount ($T_{i2}$) and timing ($T_{INJ2}$) (S408, S409).

Further, an exhaust gas temperature raising process further includes the steps of: if no in the step of checking whether the target exhaust gas temperature is 400° C. or higher (S404); checking whether the target exhaust gas temperature is 300° C. or higher; selecting the twice fuel injection (S407) when the target temperature is 400° C. or higher; and setting the second fuel injection amount ($T_{i2}$) and the second fuel injection timing ($T_{INJ2}$) (S408, S409); selecting the ignition timing retard (S410) when the target temperature is not 400° C. or higher; and setting the ignition timing retard rate ($\theta_{RD}$) (S411).

Further, the sixth embodiment of the present invention further comprises, in addition to the steps of the first embodiment a combustion status detecting process including the steps of: detecting a pressure of each cylinder (S501); calculating heat generation rate (S502); checking whether the heat generation rate is normal or not (S503); executing the second fuel injection (S504) when the heat generation rate is normal; generating an alarm (S505) when the heat generation rate is not normal and interrupting the second fuel injection (S506); setting a first fuel injection timing correction value $\Delta T_M$ (S507); setting a first fuel injection amount correction value $\Delta K$ (S508); and setting an ignition timing correction value $\theta_M$ (S509).

Further, the seventh embodiment of the present invention further comprises, in addition to the steps of the first embodiment, a combustion status detecting process including the steps of: detecting a pressure of each cylinder (S601); calculating heat generation rate (S602); checking whether a quantity of generated heat is large enough to fire the second fuel combustion or not (S603); executing the second fuel injection (S604) when the quantity of generated heat is large enough therefor; selecting the first fuel combustion correction parameter (S605) when the quantity of generated heat is not large enough therefor; and setting a first fuel injection timing correction value (S607).

As described above, in the catalyst activation system for a direct fuel injection engine according to the present invention, since the second fuel is injected from the early period to the middle period of the expansion stroke of the first (primary) combustion in such a way that the second injection fuel can be fired by the flame propagation of the primary fuel, it is possible to fire the second injection fuel without depending upon re-ignition (the possibility of mal-firing is large), so that the exhaust gas temperature can be raised stably for catalyst activation.

Further, in the catalyst activation system according to the present invention, since any one of the twice fuel injection and the ignition timing retard method (for retarding the ignition timing of the primary combustion) is selectively executed according to the engine operating conditions, and furthermore since the thrice fuel injection after the second fuel injection is selectively executed according to the activating condition of the catalyst, in such a way that the third injection fuel can be fired by the flame propagation of the second injection fuel, it is possible to realize the early activation of the catalyst, while keeping the fuel consumption rate at as low a level as possible.

Further, in the catalyst control system according to the present invention, since the third or more additional fuels are injected into each engine cylinder, after the primary combustion, according to the engine operating conditions (e.g., as when an engine started at a low temperature) and the catalyst specifications (e.g., the target exhaust gas temperature is as high as 400° C. ), it is possible to activate the catalyst more quickly and effectively, while keeping the fuel consumption rate at as low as possible.

Further, in the catalyst activation control system according to the present invention, when a heat quantity large enough to fire the second injection fuel cannot be obtained by the primary combustion of the first injection fuel under the operating conditions which satisfy the twice fuel injection conditions, since the combustion status of the primary combustion can be corrected (the heat quantity is increased), it is possible to securely prevent raw gas from being emitted as it is, so that the catalyst can be prevented from being overheated, degraded or damaged due to a misfire of the second injection fuel.

BRIEF DESCRIPTION OF THE DRAWINGS

In the attached drawings:

FIG. 1 is an illustration for the combustion process in the single fuel injection of the prior art direct fuel injection engine;

FIG. 2 is a timing chart for explaining the relationship between the heat generation pattern and $NO_x$ generation rate, in the single fuel injection of the prior art direct fuel injection engine;

FIG. 3 is an illustration for explaining the combustion process in the twice fuel injections of the direct fuel injection engine according to the present invention;

FIG. 7 is a graphical representation showing a twice fuel injection range, in which the engine speed N and the basic fuel amount $T_p$ (an engine load) are taken as engine parameters;

FIG. 8 is a timing chart showing the relationship between the fuel ignition timing and the first (primary) and second fuel injection timings corresponding to a crank angle after an engine top dead center;

FIG. 26 is a timing chart showing for assistance in explaining the abnormal combustion in the single fuel injection;

DETAILED DESCRIPTION OF THE EMBODIMENTS

Preferred embodiments of the present invention will become understood from the following detailed description referring to the accompanying drawings.

(First Embodiment)

With reference to FIGS. 3 to 12, a first (basic) embodiment of the present invention will be explained hereinbelow.

The feature of the first embodiment is to inject a second injection fuel into each engine cylinder from an early period to a middle period of an the expansion stroke of the primary (first) fuel combustion in such a way that the second injection fuel can be fired by the flame propagation of the primary fuel combustion, so that the exhaust gas temperature can be raised securely for catalyst activation.

More in details, FIG. 3 shows the combustion process in the twice fuel injection. As shown in FIG. 3, after a first injection fuel is injected into each engine cylinder, the first injection fuel is ignited for the primary fuel combustion in the same way as with the case of the conventional method. After that, a second fuel is injected again. Here, in the present invention, the secondly injected fuel is not re-ignited as with the case of the prior art apparatus, but fired by the flame propagation of the first fuel combustion. By this method, it is possible to eliminate the non-combustion region (which cannot be fired by the primary combustion of the first injection fuel) of the outermost mixture of a lean air-fuel ratio. In addition, it is possible to further fire the gas remaining in the quench layer of the wall surface of the combustion chamber and within crevices formed between a piston or piston rings and the inner wall surface of the piston by the second combustion of the second injection fuel.

Figure 4C:
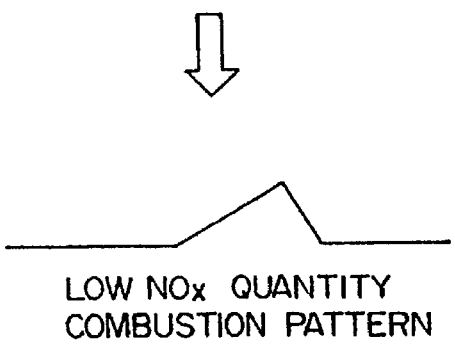
FIG. 4 is a timing chart for explaining the relationship between the heat generation pattern and $NO_x$ generation rate, in the twice fuel injections of the direct fuel injection engine according to the present invention.

Further, FIG. 4 shows the relationship between the heat generation pattern and $NO_x$ generation rate, in the twice fuel injection. As shown in FIG. 4, it is possible to suppress the heat generated in the first half of the combustion, so that the generation of the $NO_x$ can be reduced, thus improving the combustion controllability. In other words, it is possible to improve the combustion efficiency and to increase the exhaust gas temperature in the latter period of the combustion in the expansion stoke of the engine for activating the catalyst.

Figure 5:
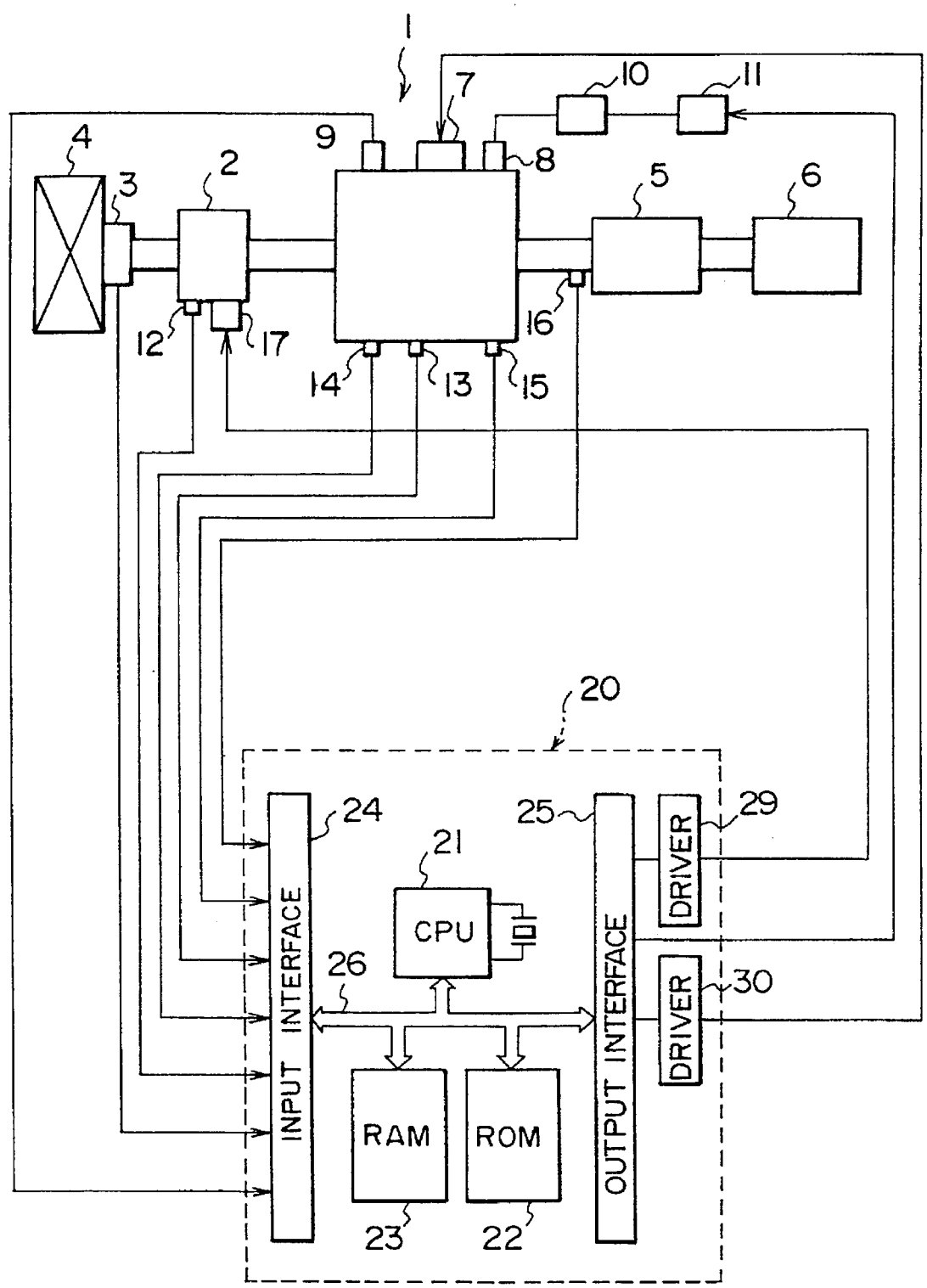
FIG. 5 is a schematic block diagram showing an engine control system of the direct fuel injection engine according to the present invention.

In FIG. 5, in a direct fuel injection engine 1 according to the present invention, fuel is directly injected into each cylinder, and the mixture of injected fuel and air is ignited by a spark plug 8. A throttle body 2 having a throttle valve therein is attached to the engine 1, and an air cleaner 4 is connected to the upstream side of the throttle body 2 via an air flow meter 3. On the other hand, a catalyst 5 for purifying exhaust gas is disposed in an exhaust system of the engine 1, and a muffler 6 is attached to the downstream side of the catalyst 5.

Further, a fuel injector 7 each for injecting high pressure fuel directly into each combustion chamber, and the spark plug 8 for igniting the injected fuel are both attached to the engine 1 so as to extend into each of the combustion chambers. Further, a cylinder pressure sensor 9 for detecting an inner cylinder pressure is also attached to the engine 1 so as to extend into the combustion chamber. Each fuel injector 6 and spark plug 8 are both arranged in a way that a relatively rich mixture can be formed in the vicinity of the firing region of the spark plug 8 by the fuel injected from the fuel injector 7; in other words, in such a way suitable for stratified combustion.

Further, the spark plug 8 is connected to a secondary winding of an ignition coil 10. An ignitor 11 is connected to a primary winding of the ignition coil 10. The ignitor 11 is connected to an electronic control unit (ECU) 20 for controlling the fuel injection and fuel ignition of the engine 1.

As shown in FIG. 5, the ECU 20 is a microcomputer for controlling the engine 1, which has a CPU 21, a ROM 22, a RAM 23, an input interface 34, an output interface 25, and a bus line 26.

To the input interface 24, there connected the air flow meter 3, the direct pressure sensor 9, a throttle opening degree sensor 12 for detecting the opening degree of the throttle valve in the throttle body 2, a crank angle sensor 13 for detecting the crank angular position of the crankshaft, a cylinder discriminating sensor 14 for discriminating a cylinder number, a coolant temperature sensor 15 for detecting the temperature of the coolant, an exhaust gas temperature sensor 16 for detecting exhaust gas temperature immediately before the catalyst 5.

On the other hand, the ignitor 11 is directly connected to the output interface 25. Further, a throttle actuator 17 and various actuators (e.g., the fuel injectors 7) are connected via a driver circuit 29 or 30f respectively.

Fixed data, such as control programs, various maps, and etc. are previously stored in the ROM 22. Various data obtained by processing the various sensor signals and data processed through various arithmetic sections of the CPU 21 are stored in the RAM 23. The CPU 21 calculates various control variables (e.g., the amount of fuel injection, the injection timing of each of the cylinders of the engine 1) in accordance with the control programs stored in the ROM 22 and on the basis of the various data stored in the RAM 23. The obtained control variables are outputted respectively to the corresponding injector 7 and the corresponding ignitor 11, etc. for fuel injection amount control and fuel injection timing control, so that the engine 1 can be maintained at optimum combustion conditions.

In a normal engine combustion control, the fuel is injected and ignited once for each cycle; that is, the fuel is injected once from the injector into the cylinder at the intake stroke or the compression stroke, and after that the mixture of air and fuel is ignited by the spark plug 8. In the combustion control of the direct fuel injection engine according to the present invention, under a predetermined engine operating conditions, after the primary fuel injected into the cylinder in the suction or compression stroke has been ignited by the spark plug 8, the subsidiary (or second) fuel is injected at least once into the cylinder in the expansion stroke of the primary fuel combustion, so that the outermost non-ignited gas can be fired by the flame propagation of the already-ignited primary combustion.

For instance, when the fuel is injected twice into the cylinder for each cycle, the primary (first) fuel is first ignited by the spark plug 8. Further, at the latter period of the combustion in the expansion stroke of the first fuel combustion, the subsidiary (second) fuel is injected into the cylinder again at such a timing as to be ignited by flame propagation from the already-ignited portion of the preceding (the first) injection fuel, without re-ignition. In the same way, in the case of the thrice fuel injection, it is possible to further inject a third fuel at the latter period of the combustion in the expansion stroke of the second fuel combustion at such a timing as to be ignited by flame propagation from the already-fired portion of the preceding (the second) injection fuel, without re-ignition.

That is, as already explained with reference to FIG. 1, in the first fuel injection, since the amount of the injected fuel is relatively excessive from the standpoint of fuel atomization, the fuel tends to be diffused at a wide angle, so that the outermost gas is excessively lean and thereby not ignited sufficiently. As a result, the amount of exhausted hydrocarbon (HC) increases. Further, when the amount of the fuel injection is large, the heat generation rate tends to increase in the first half of the combustion as shown in FIG. 2. This is because the initial combustion becomes active. So that the gas ignited in the first half is compressed in the second half and thereby nitrogen oxide $NO_x$ tends to be generated in the exhaust gas.

Accordingly, in the case where it is expected that the fuel is atomized at a wide diffusion angle under the ordinary combustion control and thereby the outermost gas is excessively lean the amount of the primary fuel injection to be ignited by the spark plug 8 is slightly reduced. Further, the second fuel is injected into the cylinder again at the latter period of the expansion stroke of the primary fuel. Further, it is also possible to further inject a third, fourth, ... fuel into the cylinder in the expansion stroke of the preceding injected fuel.

The function of the ECU 20 of the first embodiment will be described in detail hereinbelow with reference to FIG. 6. In the first embodiment of the present invention, in the case where the exhaust gas temperature is low (after the primary combustion by the ordinary (first) fuel injection and ignition) and thereby the catalyst 5 cannot be activated, an additional second fuel injection is achieved, immediately before the primary combustion is completed, to generate the second combustion on the basis of the flame propagation from the primary combustion (without depending upon the second ignition), so that the exhaust gas temperature can be raised for activating the catalyst 5.

For achieving the above-mentioned function, the ECU 20 of the first embodiment is provided with an additional control function for the second fuel injection, in addition to the ordinary first fuel control function. That is, as shown in FIG. 6, the first (ordinary) fuel control function can be realized by an engine speed calculate section 51, a crank position detect section 52, an operating condition detect section 53, a first injection amount set section 54, a first injection timing set section 55, an ignition timing set section 56, a fuel injection timing calculate section 57, an ignition timing calculate section 58, and drive sections 59 and 60. The second (invention) fuel control function can be realized by a second injection condition discriminating section 61, a second injection amount set section 62, and a second ignition timing set section 63.

In more detail, the engine speed calculate section 51 calculates the number N of engine revolutions (referred to as an engine speed N, hereinafter) on the basis of the signals applied by the crank angle sensor 13. The crank angle detecting section 52 detects the crank angular position of each cylinder on the basis of the signal of the crank angle sensor 13 and the signal of the cylinder discriminating sensor 14.

The operating condition detecting section 53 first calculates a basic fuel amount $T_p$ as an engine load (where $T_p=K \times Q/N$; K: a correction constant determined for the injector 7; Q: an intake air amount obtained by the signal of the air flow meter 3; and N: the engine speed obtained by the engine speed calculate section 51), and then decides any one of the stratification combustion (for completing the fuel injection immediately before the ignition in the latter period of the compression stroke) and the ordinary uniform combustion (for injecting fuel in the early period of the intake stroke). That is, in the stratification combustion the rich mixture in the vicinity of the ignition region of the spark plug 8 is first ignited, and after that the lean mixture is fired by the frame propagation (within the combustion chamber) of the ignited rich mixture. On the other hand, in the uniform combustion, the fuel is ignited after the fuel is mixed with air uniformly within the combustion chamber.

The first fuel injection amount set section 54 sets the fuel injection amount (a first fuel injection amount $T_{i1}$) corresponding to the primary (first) combustion according to the operating conditions. In this embodiment, the first fuel injection amount $T_{i1}$ ($T_{i1}=T_p \times COEF+T_s$) is calculated by correcting the basic fuel injection amount $T_p$ obtained by the operating condition detecting section 53 on the basis of a correction coefficient COEF for determined according to various engine operating conditions (parameters) and a voltage correction rate $T_s$. The correction coefficient COEF is an increment or decrement rate determined on the basis of the various engine parameters (engine operating conditions) obtained by the signals of the throttle sensor 12, the coolant temperature sensor 15, etc. The voltage correction rate $T_s$ is used to correct the response delay timing of the injector 7, because the actuation speed of the injector 7 is subjected to the influence of the battery voltage $V_B$.

The first injection timing set section 55 sets the injection timing (the first injection timing $T_{INJ1}$) under the operating conditions of the engine speed N and the basic fuel injection amount $T_p$ according to the decided combustion method (uniform or stratification combustion) decided by the operating condition detecting section and outputs the set value to the fuel injection timing calculating section 57. This first injection timing $T_{INJ1}$ is decided as an injection end timing $T_{END}$ in the case of the stratified combustion and as the injection start timing $T_{ST}$ in the case of the uniform combustion.

The ignition timing set section 56 obtains a basic ignition timing $\theta_{BASE}$ decided on the basis of the engine speed N and the basic fuel injection amount $T_p$ calculated by the operating condition detecting section 53, in accordance with a map retrieve, for instance. Further, the final ignition timing $\theta_{IG}$ is set by adding a coolant temperature correcting lead angle value to the basic ignition timing $\theta_{BASE}$.

The fuel injection timing calculating section 57 calculates the first injection timing $T_{INJ1}$ set by the first injection timing setting section 55 in terms of the crank angle; that is, as the injection timing relative to a reference crank angle position (e.g., a top dead center) of each cylinder (to be fuel-injected) detected by the crank angle position detecting section 52, and outputs a signal corresponding to the first injection amount $T_{i1}$ set by the first injection amount setting section 54 to the injector 7 via the driver 59.

Further, when the second injection is executed, the fuel injection timing calculating section 57 calculates the second fuel injection timing $T_{INJ2}$ set by the second injection timing setting section 63 in terms of the crank angle; that is, as the injection timing relative to a reference crank angle position of each cylinder (to be fuel-injected) detected by the crank angle position detecting section 52, and outputs a signal corresponding to the second fuel injection amount $T_{i2}$ set by the second injection amount setting section 62 (described later) to the injector 7 again via the driver 59.

The ignition timing calculating section 58 calculates the ignition timing $\theta_{IG}$ set by the ignition timing setting section 56 in terms of the crank angle; that is, as the ignition timing relative to a reference crank angle position of each cylinder (to be fuel-ignited) detected by the crank angle position detect section 52, and outputs a signal corresponding to the ignitor 11 via the driver 60.

On the other hand, the second injection condition discriminating section 61 discriminates whether the current operating range lies within a range which requires the second fuel injection on the basis of the engine speed N and the basic fuel injection amount $T_p$ detected by the operating condition detecting section 53. If the second fuel injection is determined to be necessary, the second injection condition discriminating section 61 outputs a second fuel injection command to the second injection amount setting section 62 and the second injection timing setting section 63.

In practice, the second fuel injection range can be discriminated by using a map (as shown in FIG. 7) stored in the ROM 22. This map indicates a second fuel injection range (hatched portion) decided empirically, in which the abscissa designates the engine speed N and the ordinate designates the basic fuel injection amount $T_p$ (engine load) detected by the operating condition detect section 53. In this second fuel injection range, the exhaust gas temperature is low because the first fuel injection amount for the primary combustion is small due to a low engine speed N and a low engine load in the stratification combustion, and thereby it is difficult to activate the catalyst 5. In summary, by retrieving from the map in the ROM 22, the second injection condition discriminate section 61 discriminates whether the current engine operating conditions satisfy the conditions designated by the second fuel injection range as shown in FIG. 7, and outputs a command when the second fuel injection is necessary.

In response to this command outputted by the second injection discriminating section 61, the second injection amount setting section 62 sets the second injection amount $T_{i2}$ fired by flame propagation of the primary combustion by the first injection. In this embodiment, the second injection amount $T_{i2}$ is decided on the basis of the basic fuel injection amount $T_p$ (the basic value of the first injection amount $T_{i1}$). Without being limited thereto, however, it is also possible to decide a minimum fuel injection amount fired by the flame propagation of the primary combustion by some experiments and further to adjust the minimum amount in the incremental direction.

The second injection timing setting section 63 sets the second injection timing (at which the second injection fuel can be securely fired by the flame propagation of the primary combustion) according to the operating conditions determined on the basis of the engine revolution speed N and the basic fuel injection amount $T_p$, by a map retrieval, for instance.

More in details, it is necessary to decide the second fuel injection timing at an appropriate range in order to fire the second injection fuel in the latter period (i.e., the expansion stroke) of the primary combustion without reignition. For instance, FIG. 8 shows the relationship between the fuel ignition timing and the first (primary) and second fuel injection timing, in relation to the crank angle after a top dead center. As shown in FIG. 8, when the fuel injection start timing is determined roughly between 10 and 80 degrees after the top dead center, the stable firing of the second injection fuel can be obtained without re-ignition. Further, when the fuel injection start timing is determined roughly between 30 and 60 degrees after the top dead center, the optimum firing of the second injection fuel can be obtained without reignition. However, smoke is produced, when the second injection timing is determined within an excessively short time after the primary combustion timing. This is because the fuel cannot be sufficiently diffused. On the other hand, not only the exhaust gas temperature cannot rise high, but also HC increases when the second injection timing is determined within an excessively long time after the primary combustion timing. This is because the fuel is diffused excessively. So that, the exhaust emission deteriorates.

Accordingly, it is necessary to determine the optimum injection timing of the second injection fuel on the basis of some experiments by determining the engine speed N and the basic fuel injection amount $T_p$ (engine load) as the parameters and to store the experiment results as specified map. The second injection timing set section 63 can set an appropriate second fuel injection timing $T_{INJ2}$ according to the operating conditions by retrieving from the map. Although the optimum value of the second injection timing $T_{INJ2}$ differs according to the engine specification, the number of cycles (e.g., 2 cycles, 4 cycles, etc. ), etc., it is possible to use the same optimum injection timing for all the direct fuel injection engine qualitatively, so that the re-ignition is not required for firing the second injection fuel. In the engine 1 of the present invention, the second fuel injection timing is determined between the early period and the middle period of the expansion stroke of the primary combustion; that is, between 30 and 60 degrees after the top dead center (ATDC).

Figure 9A:
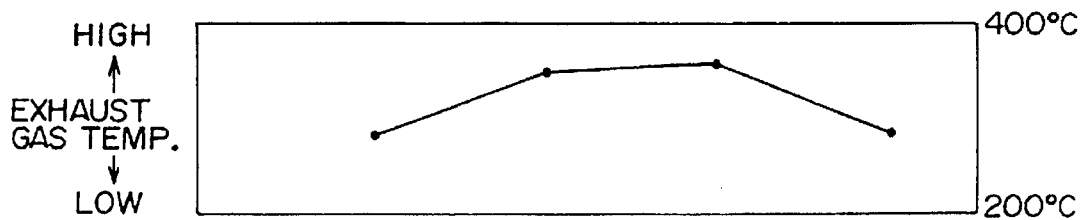
FIG. 9A is a graphical representation showing the relationship between the exhaust gas temperature and the second fuel injection timing corresponding to the crank angle after top dead center (ATDC)
Figure 9B:
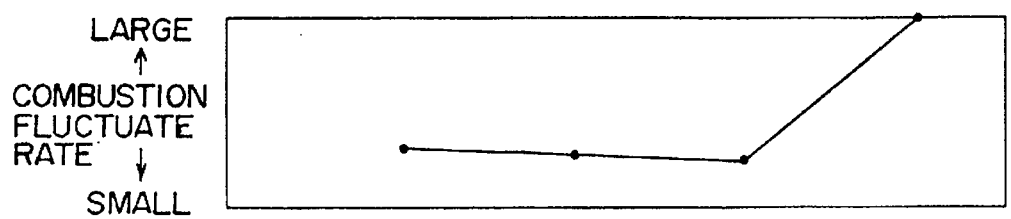
FIG. 9B is a graphical representation showing the relationship between the combustion fluctuation rate and the second fuel injection timing near ATDC.
Figure 9C:
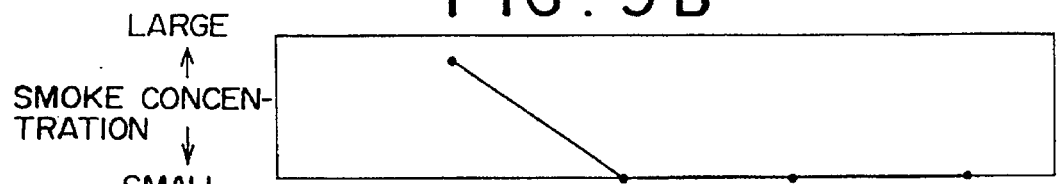
FIG. 9C is a graphical representation showing the relationship between the smoke concentration and the second fuel injection timing near ATDC.
Figure 9D:
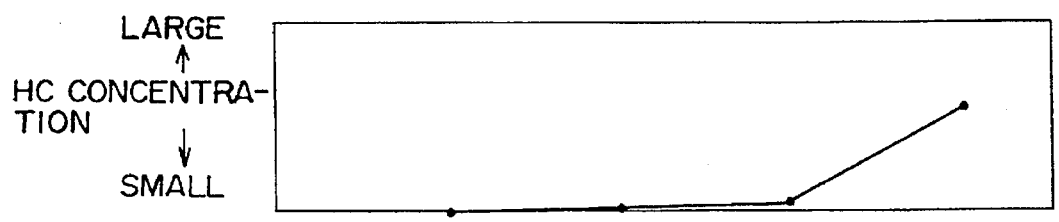
FIG. 9D is a graphical representation showing the relationship between the HC concentration and the second fuel injection timing near ATDC.
Figure 9E:
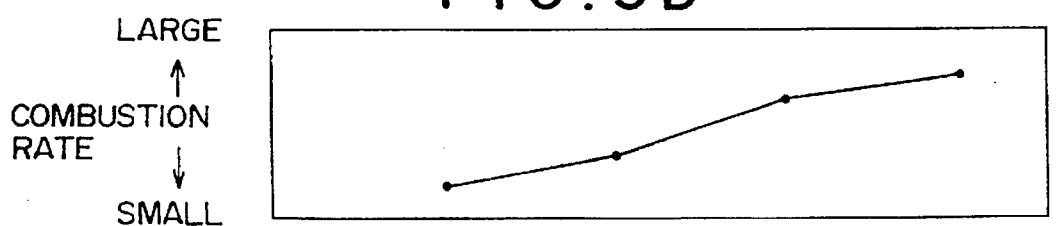
FIG. 9E is a graphical representation showing the relationship between the fuel consumption rate and the second fuel injection timing near ATDC.

In more detail, FIGS. 9A to 9E show the experiment results, which indicate that the optimum second injection start timing after top dead center (ATDC) lies between 30 and 60 degrees. Further, FIG. 9A shows the relationship between the exhaust gas temperature and the second fuel start timing in relation to the crank angle after top dead center (ATDC); FIG. 9B shows the relationship between the fluctuation rate of the combustion and the same start timing in relation to ATDC; FIG. 9C shows the relationship between the concentration of smoke and the same start timing in relation to ATDC; FIG. 9D shows the relationship between the concentration of HC and the same start timing in relation to ATDC; and FIG. 9E shows the relationship between the fuel consumption rate and the same start timing in relation to ATDC.

As explained above, it is necessary to raise the exhaust gas temperature to some extent in order to maintain the activation of the catalyst. In the conventional method, when the exhaust gas temperature is excessively low after normal primary fuel injection, the second fuel injection or the second fuel ignition timing has been retarded to shift the second combustion phase, as shown by dashed-line in FIG. 10 which shows the relationship between the fuel consumption rate and the exhaust gas temperature. In this prior art method, however there exists a problem in that the exhaust gas temperature still cannot be raised sufficiently high or the fuel consumption rate deteriorates remarkably.

Figure 10:
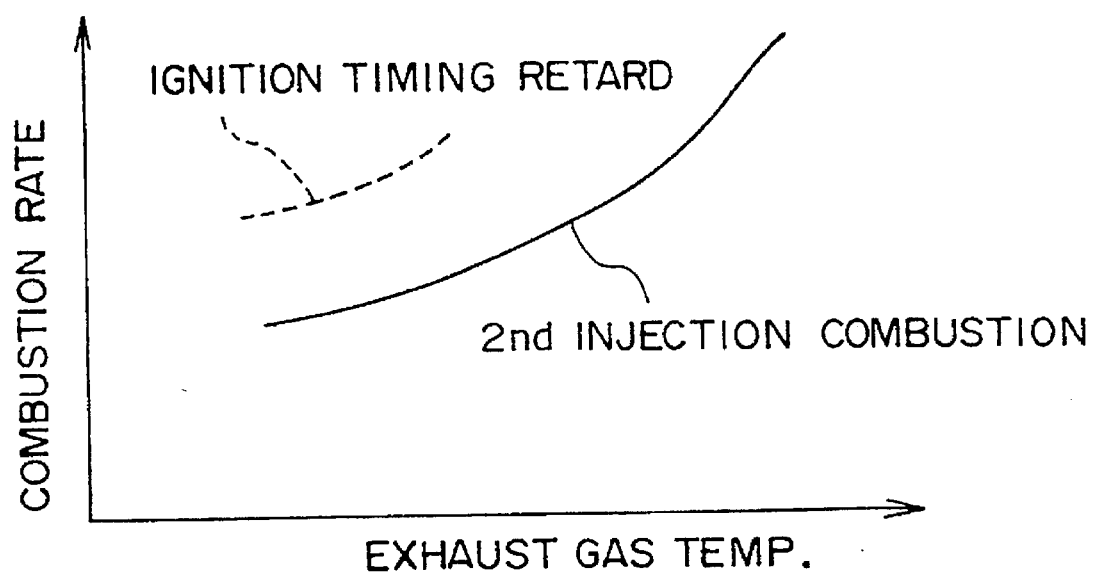
FIG. 10 is a graphical representation showing the relationship between the fuel consumption rate and the exhaust gas temperature, in the second fuel injection and the ignition timing retard.

In the first embodiment, since the second fuel is additionally injected and fired by the flame propagation of the already-burnt fuel (without re-ignition), it is possible to improve the fuel combustion controllability after the first fuel is injected and further ignited once for each cycle, so that the exhaust gas temperature can be raised effectively and securely for activation of catalyst, as shown by a solid line in FIG. 10, without generating HC and $NO_x$, in an excellent fuel consumption rate.

Further, in the above-mentioned first embodiment, although the second fuel injection amount and the timing are both decided on the basis of the engine speed N and the engine load (i.e., the basic fuel injection amount $T_p$ for the primary fuel combustion), without being limited only thereto, it is also possible to adopt the other engine operating conditions such as the intake air amount per cycle, the pressure in intake pipe, etc. as far as the same effect can be obtained.

The operation of the second fuel injection controlled by the ECU 20 shown in FIG. 6 will be described hereinbelow with reference to the flowchart shown in FIG. 11 (the first fuel injection setting routine) and FIG. 12 (the second fuel injection setting routine).

First, in the first fuel injection setting routine shown in FIG. 11, in step S101, the CPU 21 (referred to as control simply, hereinafter) reads the basic fuel injection amount $T_p$ on the basis of a predetermined address of the RAM 23. In step S102, the control reads the engine operating condition parameters such as the signals from the throttle sensor 12f the coolant temperature sensor 15, and etc. In this case, the order of step S101 and step S102 can be exchanged with each other.

Further, in step S103, the control sets a coefficient COEF for correcting the basic fuel injection amount, which is determined according to various engine operating conditions (e.g., to increase or decrease the fuel amount) by reading in the step S102. In step S104, the control further sets the voltage correction rate $T_s$ on the basis of a battery voltage $V_B$, proceeding to step S105.

In step S105, the control sets the first injection amount $T_{i1}$ ($T_{i1} \leftarrow T_p \times COEF + T_s$) by multiplying the basic fuel injection amount $T_p$ read in step S101 by the correction coefficient COEF determined according to the engine operation conditions and set in step S103 and further by adding the voltage correction rate $T_s$ set in step S104. Further, in step S106, the control sets the first fuel injection timing $T_{INJ1}$ according to the combustion method (uniform or stratification combustion), passing through the routine.

Figure 12:
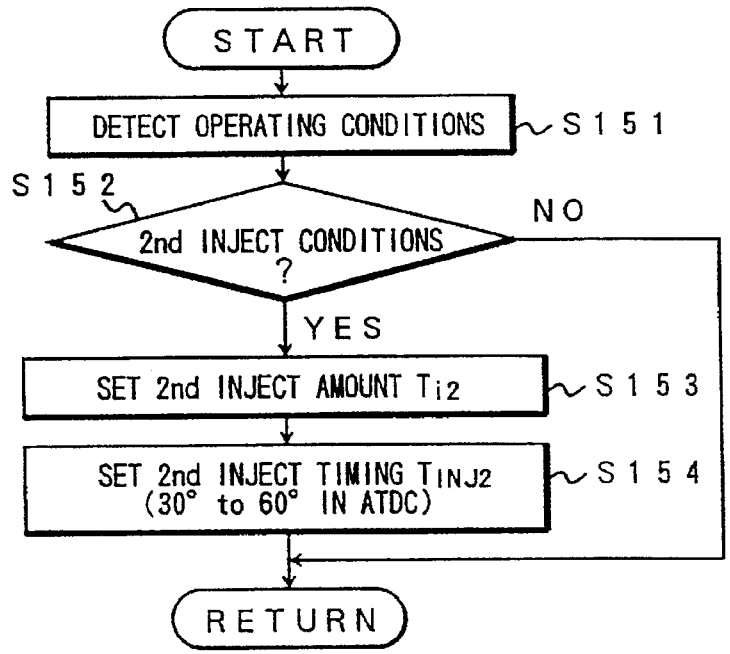
FIG. 12 is a flowchart showing the procedure of the second fuel injection setting routine of the first embodiment.

In the second fuel injection setting routine shown in FIG. 12, in step S151, the control detects the engine operating conditions by reading the engine speed N and the engine load (the basic fuel injection amount $T_p$). In step S152, the control checks whether the current operating conditions satisfy the second fuel injection conditions. As explained above with reference to FIG. 7, the second injection conditions can be decided by the map; more in details, by checking whether or not the engine speed N and the basic fuel injection amount $T_p$ (engine load) lie within the second fuel injection range (the hatched-line portion).

As a result, when the second fuel injection conditions are not satisfied, for instance as when the engine is driven under a high load in the uniform combustion or when driven at a high speed but under a low load in the stratified combustion the control passes through the routine, without executing the second fuel injection. However, when the second fuel injection conditions are satisfied, for instance, as when the engine is driven at a low speed and under a low load in the stratified combustion, the control proceeds to step S153 to set the second fuel injection amount $T_{i2}$. Further, in step S154, the control sets an optimum second fuel injection timing $T_{INJ2}$ by the map on the basis of the engine speed N and the basic fuel injection amount $T_p$ (engine load), passing through the routine.

Upon ending the above-mentioned respective routines, the setted first injection amount $T_{i1}$ ($T_{i1} \leftarrow T_p \times COEF + T_s$) and the first fuel injection timing $T_{INJ1}$ are set in a fuel injection timer and a fuel ignition, respectively. The fuel injection timer starts when the cylinder to be injected reaches a predetermined reference crank angular position (e.g., top dead center), to inject the first fuel into the cylinder. In the same way, the fuel ignition timer starts when the cylinder to be ignited reaches a predetermined reference crank angle, to ignite the first injection fuel for the primary combustion start.

Further, when the second fuel injection conditions are satisfied in the stratified combustion (which is low fuel consumption rate and better exhaust gas character), the first fuel injection amount $T_{i1}$ is injected in the latter period of the compression stroke, and the second injection amount $T_{i2}$ is injected into the cylinder at such an optimum timing immediately before the end of the primary combustion by the first injection, to start the second combustion by the flame propagation of the primary combustion, without need of re-ignition. Here, the second fuel combustion is mainly used to increase only the exhaust gas temperature, without moving the piston.

In other words, since the second injection fuel is not fired by the re-ignition but fired by the flame propagation from the primary fuel combustion, it is unnecessary to ignite fuel twice in each cycle, so that the second combustion can be realized securely, while economizing the ignition energy. In addition, since the second injection fuel is injected at an optimum injection timing, it is possible to increase the exhaust gas temperature stably for activation of the catalyst, without generating smoke and increasing HC, thus keeping the fuel consumption rate at a minimum level.

(Second Embodiment)

A second embodiment will be described hereinbelow with reference to FIGS. 13 and 14, which is different from the first embodiment in that the additional fuel injection and ignition by the flame propagation of the preceding fuel combustion are executed N-timings according to the engine operating conditions.

Figure 13:
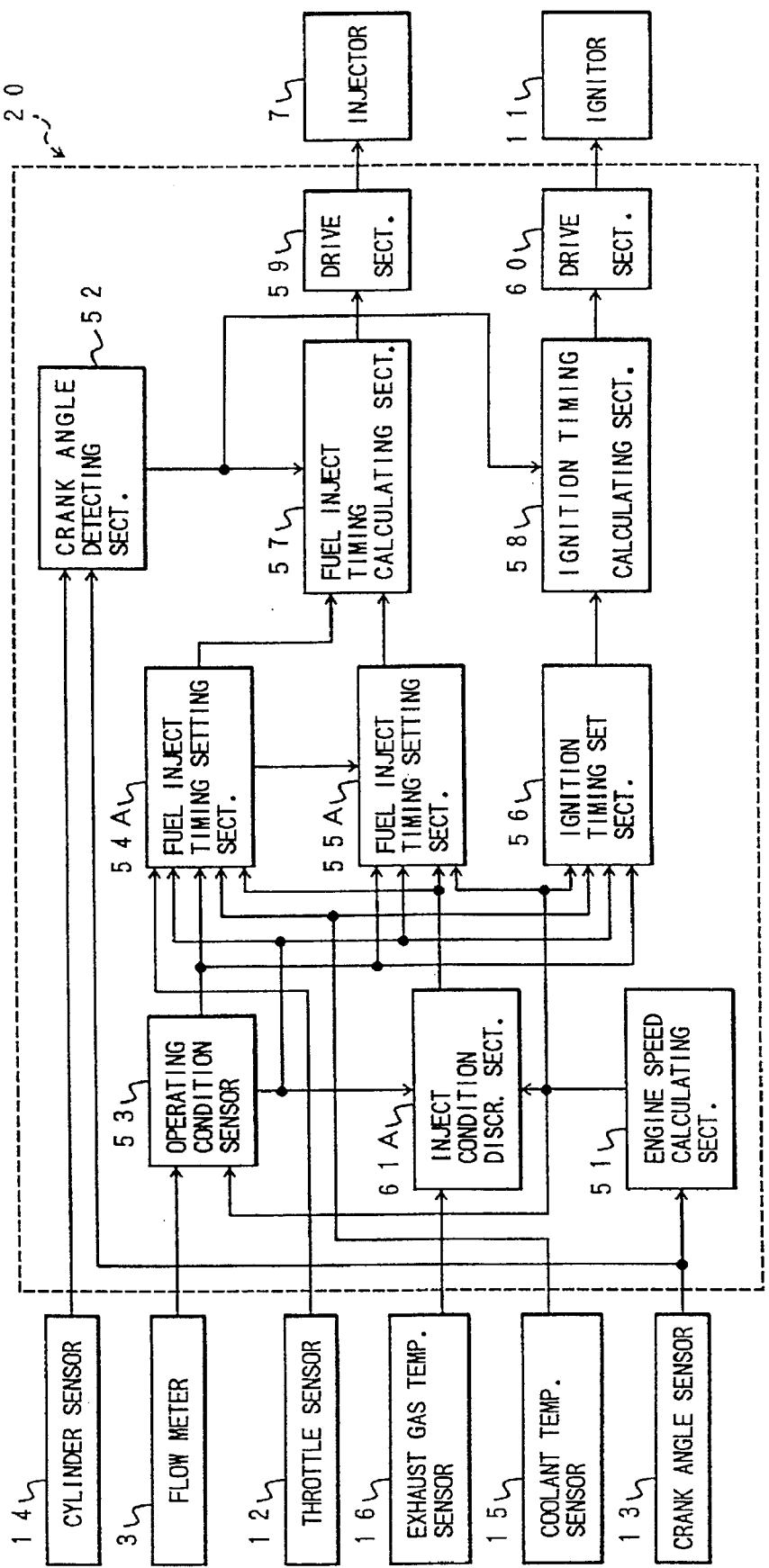
FIG. 13 is a functional block diagram of an electronic control unit showing a second embodiment of the catalyst activation control apparatus.

In FIG. 13, the ECU 20 further comprises an exhaust gas temperature sensor 16. Further, the first and second fuel injection amount setting sections 54 and 62 of the first embodiment shown in FIG. 6 are combined as a single fuel injection amount set section 54A, and further the first and second fuel ignition timing setting sections 55 and 63 of the first embodiment shown in FIG. 6 are combined as a single fuel ignition timing setting section 55A. Further, the second injection condition discriminating section 61 shown in FIG. 6 is replaced with another injection condition discriminating section 61A for executing N-time fuel combustion.

More in details, the injection discriminating section 61A discriminates whether a plurality of the additional fuel injections are necessary or not under the current engine operating conditions, and outputs a plurality of commands to the fuel injection amount setting section 54A and the fuel injection timing setting section 55A according to the discrimination results.

Further, the second and after injection ranges can be discriminated by using a plurality of maps (as shown in FIG. 7) stored in the ROM 22, repeatedly. These maps indicate a second injection range (hatched portion) decided empirically, in which the abscissa designates the engine speed N and the ordinate designates the engine load (basic fuel injection amount $T_p$ detected by the operating condition detecting section 53. In this second injection range, the exhaust gas temperature is low after the primary combustion of the first fuel injection, and thereby it is difficult to activate the catalyst 5, as when the low engine speed and the engine load are both low in the stratified combustion). By retrieving from the map in the ROM 22, the injection condition discriminating section 61A discriminates whether the current engine operating range satisfies the second fuel injection range or not.

Further, after the second fuel injection, the injection condition discriminating section 61A further discriminates whether the third fuel injection is necessary or not to maintain the active status of the catalyst 5 on the basis of the exhaust gas temperature detected by the exhaust gas temperature sensor 16. Further, after the third fuel injection, the fourth, fifth, . . . fuel injection conditions are discriminated by the injection condition discriminating section 61A.

The injection amount setting section 54A sets the fuel injection amount according to the number of fuel injections per cycle designated by the injection condition discriminating section 61A. That is, when the injection discriminating section 61A designates one fuel injection per cycle the fuel injection amount $T_i$ corresponding to the first (primary) fuel combustion is set according to the engine operating conditions. This fuel injection amount $T_i$ can be set by correcting (increasing or decreasing) the basic fuel injection amount $T_p$ (calculated by the operating condition detecting section 53) on the basis of the correction coefficient COEF determined according to various engine operating conditions decided by the throttle sensor 12, the coolant temperature sensor 15, etc.) and the voltage correction rate $T_s$ (for correcting the response delay timing of the injector 7 due to change in a battery voltage $V_B$).

Further, when the injection discriminating section 61A designates two or more fuel injections per cycle, the fuel injection amount setting section 54A sets the first fuel injection amount $T_{i1}$ slightly smaller than the basic fuel injection amount $T_i$ (to be ignited by the spark ignition), and further the second and after fuel injection amounts $T_{i2}$ $T_{i3}$, . . . (to be fired by the flame propagation of the preceding fuel combustion).

The first fuel injection amount $T_{i1}$ can be set with reference to a map obtained empirically, in which a fuel injection amount for providing an optimum fuel atomization diffusion and an optimum heat generation rate is determined according to the engine operating conditions such as the engine speed N and the engine load (i.e., the basic fuel injection amount $T_p$). Further, the second and after fuel injection amounts $T_{i2}$, $T_{i3}$, . . . , are set in such a way as to be fired by the flame propagation of the preceding combustion, in sequence at a predetermined ratio to the first fuel injection amount $T_{i1}$, for instance. Further, the third and after fuel injection rates $T_{i3}$, $T_{i4}$, . . . are determined to be equal to or slightly larger than the second fuel injection amount $T_{i2}$.

In the case of the normal (single) fuel injection per cycle, the fuel injection timing set section 55A decides a fuel injection timing $T_{INJ1}$ on the basis of the combustion (uniform or stratification) method decided by the operating condition detecting section 53, in response to the command applied from the injection condition discriminating section 54, and under the engine operating conditions determined by the engine speed N and the basic fuel injection amount $T_p$. In the same way, in the case of the n-time fuel injections per cycle, the fuel injection timing set section 55A decides a first fuel injection timing $T_{INJ1}$, a second fuel injection timing $T_{INJ2}$, a third fuel injection timing $T_{INJ3}$, . . . , and outputs the decided fuel injection timings to the fuel injection timing calculating section 58, in sequence.

In this case, the primary injection timing $T_{INJ1}$ and the first additional fuel injection timing $T_{INJ1}$ are both decided as the injection start timings in the case of the uniform combustion method, and as the injection end timing in the case of the stratified combustion method. Further, the second and after fuel injection timings $T_{INJ2}$, $T_{INJ3}$, . . . are decided with reference to a map determined according to the engine operating conditions (the engine speed N and the basic fuel injection amount $T_p$), for instance in such a way that the n-th injected fuel can be securely fired by the flame propagation of the preceding combustion.

For instance, when the fuel injections are executed twice, for instance, in order to securely fire the second injection fuel without re-ignition, it is preferable that the second injection timing is determined roughly between 10 and 80 degrees after the top dead center as shown in FIG. 8. However, when the second injection timing is determined within an excessively short time immediately after the primary combustion timing, since the fuel cannot be diffused sufficiently, smoke is produced due to lack of diffusion. On the other hand, since the fuel is diffused excessively when the second injection timing is determined within an excessively long time after the primary combustion timing, not only the exhaust gas temperature cannot rise high, but also HC increases, so that the exhaust emission deteriorates.

Accordingly, it is necessary to determine the optimum injection timings on the basis of some experiments by setting the engine speed N and the engine load (the basic fuel injection amount $T_p$) as the parameters and to store the experiment results as specified maps. The injection timing setting section 55A can set appropriate second and after injection timings $T_{INJ2}$, $T_{INJ3}$, .... according to the operating conditions in accordance with the map retrieval. Although the optimum values of the these injection timings $T_{INJ2}$, $T_{INJ3}$, ... differ according to the engine configuration and the number of cycles (e.g., 2 cycles, 4 cycles, etc. ), it is possible to use the same optimum injection timings for all the direct fuel injection engine qualitatively, so that the re-ignitions are not required for the second and after fuel injection.

In the engine 1 of the present invention, the second fuel injection is determined empirically between the early period and the middle period of the expansion stroke of the primary combustion. In more practice, as shown in FIG. 8, it is preferable to set the optimum injection timing between 30 and 60 degrees after the top dead center (ATDC). Further, the third injection fuel is injected into the cylinder at such a timing immediately before the second fuel injection ends and thereby the third injection fuel can be fired by the flame propagation of the second fuel combustion. In more practice, the third fuel injection is set roughly between 90 and 120 degrees after the top dead center. Further, each of the fourth and after fuel injection timings is set at such a timing as to be injected into the cylinder immediately before the preceding fuel injection ends in the expansion stroke and thereby the injected fuel can be fired by the flame propagation of the preceding fuel combustion.

The ignition timing setting section 56 obtains a basic ignition timing $\theta_{BASE}$ decided on the basis of the engine speed N and the basic fuel injection amount $T_p$ calculated by the operating condition detecting section 53, in accordance with a map retrieve, for instance. Further, the final ignition timing $\theta_{IG}$ is set by adding a coolant temperature correcting lead angle value to the basic ignition timing $\theta_{BASE}$.

The fuel injection timing calculating section 57 calculates the first injection timing $T_{INJ1}$ set by the first injection timing setting section 55A in terms of the crank angle relative to the reference crank angle position of each of the cylinder (to be fuel-injected) detected by the crank angle position detecting section 52, and outputs signals corresponding to the injection amounts set by the injection amount setting section 54A and the injection timings set by the injection timing setting section 55A to the injector 7 via the driver 59.

The ignition timing calculating section 58 calculates the ignition timing $\theta_{IG}$ set by the ignition timing setting section 56 in terms of the crank angle relative to the reference crank angle position of each cylinder (to be fuel-ignited) detected by the crank angle position detecting section 52, and outputs a signal corresponding thereto to the injector 11 via the driver 60.

The fuel injection setting process executed by the ECU 20 will be described hereinbelow with reference to the flowchart shown in FIG. 14.

Figure 14:
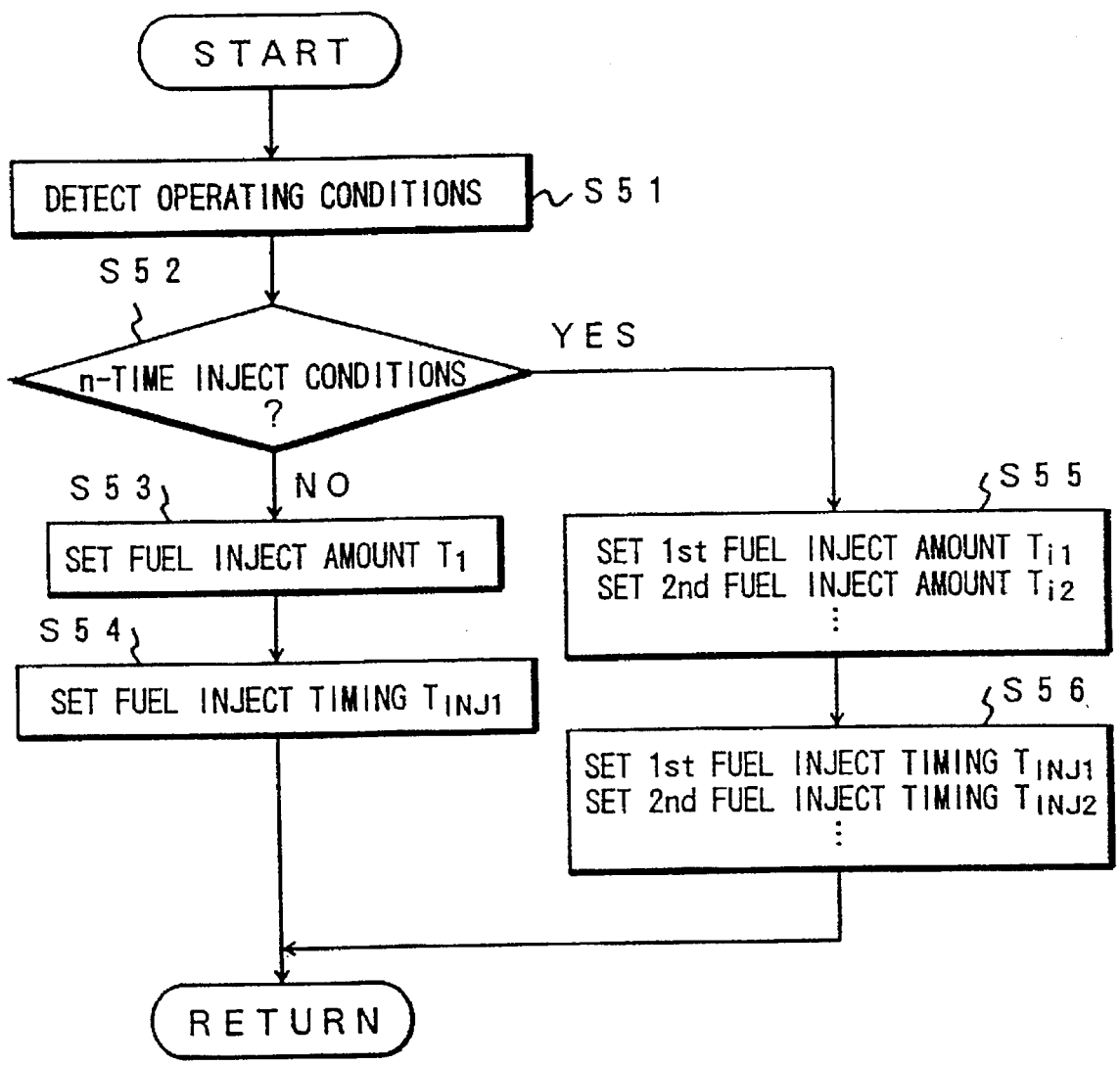
FIG. 14 is a flowchart showing the procedure of the n-time fuel injection setting routine of the second embodiment.

The routine as shown in FIG. 14 is executed for each predetermined period. In step S51, the control reads the engine operating conditions (i.e., the engine speed N and the basic fuel injection amount $T_p$) and the number of fuel injections per cycle. In step S52, the control checks whether the n-time fuel injection conditions are satisfied on the basis of the current engine operating conditions. In this step S52, if the preceding fuel injection is the normal (single) fuel injection, the control checks whether the current operating conditions lie within the second fuel injection range on the basis of the engine speed N and the basic fuel injection amount $T_p$ (engine parameters). If the second fuel injection has been already executed at the preceding fuel injection, control checks whether the third and after fuel injections are necessary on the basis of the exhaust gas temperature detected by the exhaust gas temperature sensor 16.

As a result, when the second or after fuel injections are not required as when the engine 1 is operating under a high load in the uniform combustion or when the engine 1 is operating at a high speed and under a low load even in the stratified combustion, the control proceeds from step S52 to step S53 to execute the ordinary (single) fuel injection per cycle. On the other hand, when the second and after fuel injections are needed as with the case where the engine 1 is operating at a low speed and under a low load in the stratified combustion, the control proceeds to step S55 to execute the n-time fuel injections per cycle.

In step S53 (single fuel injection per cycle), the control sets the first injection amount $T_{i1}$ ($T_{i1} \leftarrow T_p \times COEF + T_s$) by correcting the basic fuel injection amount $T_p$ on the basis of the correction coefficient COEF (to increase the fuel amount) determined by the engine operating parameters represented by the signals of the throttle sensor 12, the coolant temperature sensor 15, etc. and the voltage correction rate $T_s$ determined on the basis of the battery voltage $V_B$. Further, in step S54, the control sets the fuel injection timing $T_{INJ}$ according to the combustion method, passing through the routine.

When the second and after fuel injections are needed per cycle, in step S55, the control sets the first (primary) fuel injection amount $T_{i1}$ in which the optimum fuel atomization diffusion and heat generation can be obtained, with reference to the map. Further, control sets the second fuel injection amount $T_{i2}$ and the third additional fuel injection amount $T_{i3}$, ... by multiplying the first fuel injection amount $T_{i1}$ by a predetermined ratio, respectively so that the injected fuel can be fired by the flame propagation of the preceding combustion.

Further, in step S56, in the same way as the case of the injection timing $T_{INJ}$ in the ordinary uniform combustion, the control sets the first fuel injection timing $T_{INJ1}$ and further the second fuel injection timing $T_{INJ2}$, the third fuel injection timing $T_{INJ3}$, ... with reference to the maps determined on the basis of the engine speed N and the basic fuel injection amount $T_p$, so that the second and after injection fuels can be securely fired by the flame propagation of the preceding combustion, passing through the routine.

Upon ending the above-mentioned routine, the first fuel injection amount and the injection timing setted in the steps S53 and S55 are both set to a fuel injection timer and a fuel ignition timer, respectively. Further, the fuel injection timer is started from a predetermined reference crank angle position of the cylinder, to inject the first fuel into the cylinder. In the same way, the fuel ignition timer is started from a predetermined reference crank angle position of each cylinder, to ignite the first fuel, thus the mixture in the combustion chamber is ignited for the primary combustion for each cylinder.

In this case, when the second and after fuel injections are executed under the stratified combustion (which is low in the fuel consumption and better exhaust gas characteristics), the first (primary) fuel injection amount $T_{i1}$ is injected at the latter period of the compression stroke, and the second injection amount $T_{i2}$ is injected into the cylinder at such an optimum timing immediately before the primary combustion by the first fuel injection ends, to start the second combustion by the flame propagation of the primary combustion without need of re-ignition. Here, the second fuel combustion is mainly consumed to increase only the exhaust gas temperature, without moving the piston. However, when the exhaust gas temperature does not rise sufficiently high after the second fuel combustion, the third fuel injection amount $T_{i3}$ is injected at the same expansion stroke to continue the re-combustion due to the flame propagation of the preceding combustion.

As already explained, in order to maintain the activation of the catalyst 5, it is necessary to raise the exhaust gas temperature to some extent. In the conventional method, when the exhaust gas temperature is excessively low after the ordinary primary fuel injection, the fuel injection or the ignition timing has been retarded to shift the combustion phase, as shown by dashed line in FIG. 10. In the prior art method, however, there exists a problem in that the exhaust gas temperature still cannot be raised sufficiently high or the fuel consumption rate deteriorates remarkably.

In the second embodiment, however, after the first fuel is injected and ignited once for each cycle, since the second and after fuels are additionally injected and ignited by the flame propagation of the preceding combustion, it is possible to increase the fuel combustion controllability, so that the exhaust gas temperature can be raised effectively for activation of catalyst, as shown by a solid line in FIG. 10, without generating HC and $NO_x$ in an excellent fuel consumption rate.

In this case of the second embodiment, since the second and after fuel injection are not ignited by the spark plug 8 but fired by the flame propagation from the preceding combustion, it is unnecessary to ignite fuel twice or more in each cycle, so that the second and after combustion can be realized securely, while economizing the ignition energy. In addition, since the second and after fuels are injected at an optimum injection timing, respectively, it is possible to increase the exhaust gas temperature stably for activation of catalyst 5, without generating smoke and increasing HC, while keeping the fuel consumption at a minimum level.

(Third Embodiment)

Figure 15:
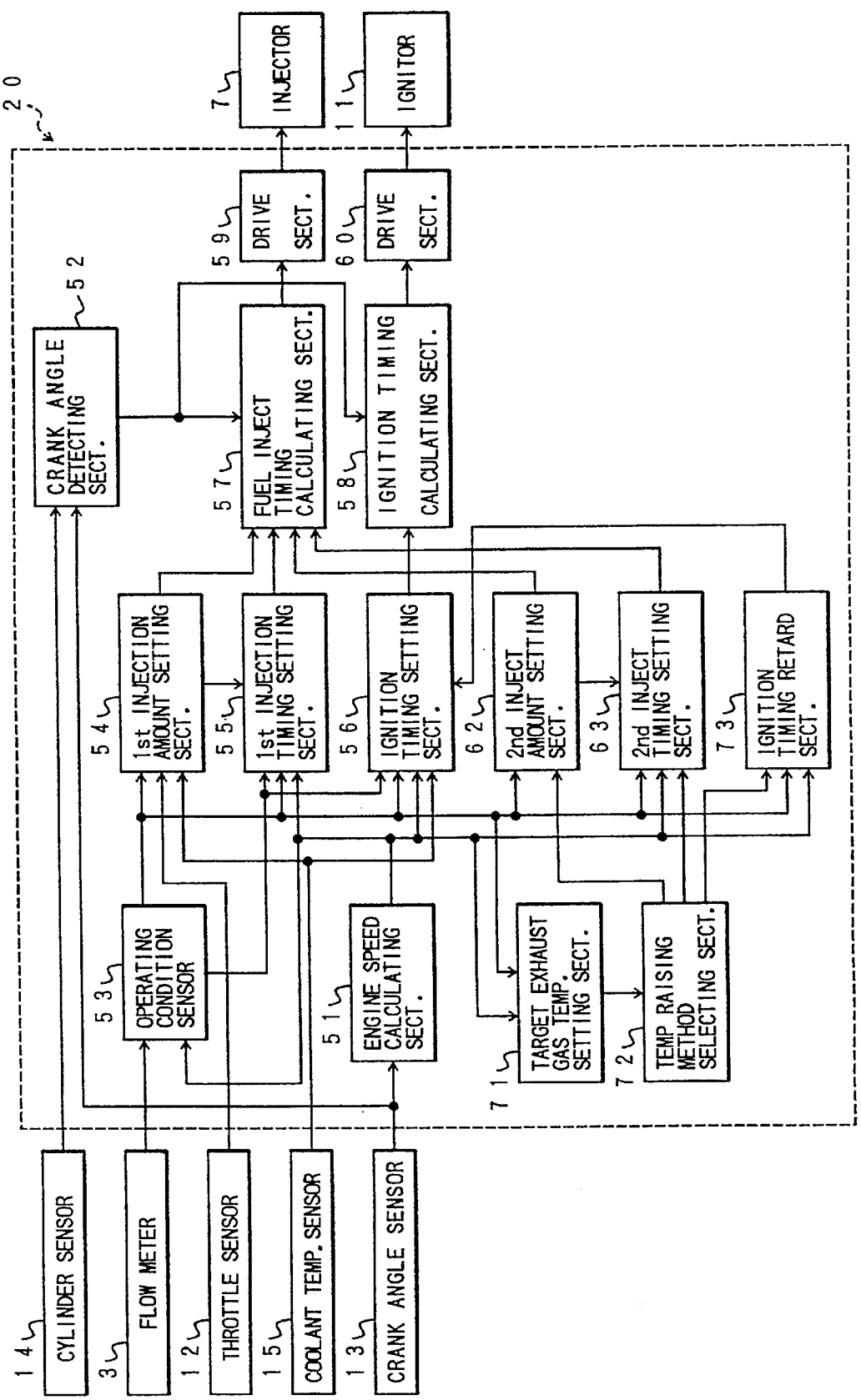
FIG. 15 is a functional block diagram of an electronic control unit showing a third embodiment of the catalyst activation control system.

The third embodiment will be described hereinbelow with reference to FIGS. 15, 16 and 17B and 17B. This third embodiment is different from the first embodiment shown in FIG. 6 in that any one of the twice fuel injection method and the ignition timing retard method (the primary fuel ignition timing is retarded to increase the exhaust gas temperature) is selected according to the engine operating conditions. In FIG. 15, a target exhaust gas temperature setting section 71 is provided instead of the second injection condition discriminating section 61, and further a temperature raising method selecting section 72 and an ignition timing retard section 73 are additionally provided, in addition to the elements shown in FIG. 6.

The target exhaust gas temperature setting section 71 discriminates whether the current engine operating conditions lie within an operating range in which the catalyst 5 cannot be activated, that is, in an exhaust gas temperature raising range or not. If the exhaust gas temperature raising range is determined, this target exhaust gas temperature setting section 71 sets a target temperature of the exhaust gas. The setted target exhaust gas temperature is previously stored in a map, for instance under consideration of the characteristics of the catalyst 5. This map is retrieved by using the engine speed N and the engine load (the basic fuel injection amount $T_p$) as parameters, and the retrieved value is outputted to the temperature raising method selecting section 72.

Figure 17A:
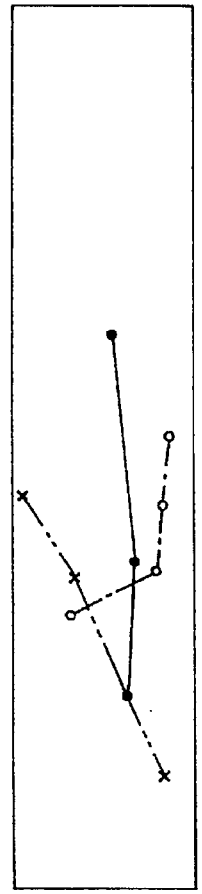
FIG. 17A is a graphical representation showing the relationship between the HC concentration and an indicated specific fuel consumption rate (ISFC), in the twice fuel injection, the ignition timing retard, and the intake throttle.

The temperature raising method selecting section 72 selects any one of the method of raising the exhaust gas temperature by injecting fuel twice and the method of raising the same by retarding the ignition timing of the primary combustion, according to the target exhaust gas temperature setted by the target exhaust gas temperature setting section 71. FIG. 17A shows the relationship between the indicated specific fuel consumption rate ISFC (the abscissa) and the HC concentration (the ordinate) and FIG. 17B shows the relationship between the indicated specific fuel consumption rate ISFC (the abscissa) and the exhaust gas temperature (the ordinate) both in idling operation, in which the solid lines designate the method of retarding the ignition timing of the primary combustion; the alternate long and short lines designate the method of injecting fuels twice; and the alternate long and two short dashes lines designate the method of throttling the intake pipe. FIG. 17B indicates that the twice fuel injection is effective as the effect of raising the exhaust gas temperature, as compared with the ignition timing retarding method. However, the fuel consumption rate increases in the case of the twice fuel injection.

Therefore, in order to realize the maximum temperature raising effect in the minimum possible fuel consumption rate, it is preferable to change the exhaust gas temperature raising method according to the target exhaust gas temperature. That is, when the target exhaust gas temperature is relatively low, the ignition timing retarding method is selected to economize the fuel. On the other hand, when the target exhaust gas temperature is relatively high, the twice fuel injection method is selected to raise the exhaust gas temperature quickly.

In this third embodiment, when the target exhaust gas temperature is equal to or slightly higher than 300° C., the ignition timing retarding method is selected, so that the temperature raising method selecting section 72 outputs an ignition timing retarding command. On the other hand, when the target exhaust gas temperature is higher than 300° C., the twice fuel injection method is selected, so that the temperature raising method selecting section 72 outputs a twice fuel injection command, as shown in FIG. 17B.

Therefore, when the temperature raising method selecting section 72 selects the twice fuel injection method to raise the exhaust gas temperature, as already explained in the first embodiment, the second injection amount setting section 62 sets the second fuel injection amount $T_{i2}$, and the second injection timing setting section 62 set the second fuel injection timing $T_{INJ2}$.

Further, when the temperature raising method selecting section 72 selects the ignition timing retarding method to raise the exhaust gas temperature, the ignition timing retard section 73 sets an ignition timing retarding rate $\theta_{RD}$ by retrieving an ignition timing retarding angle correction map decided on the basis of the engine speed N and the basic fuel injection amount $T_p$. The set ignition timing retarding rate $\theta_{RD}$ is outputted to the ignition timing setting section 56.

Figure 16:
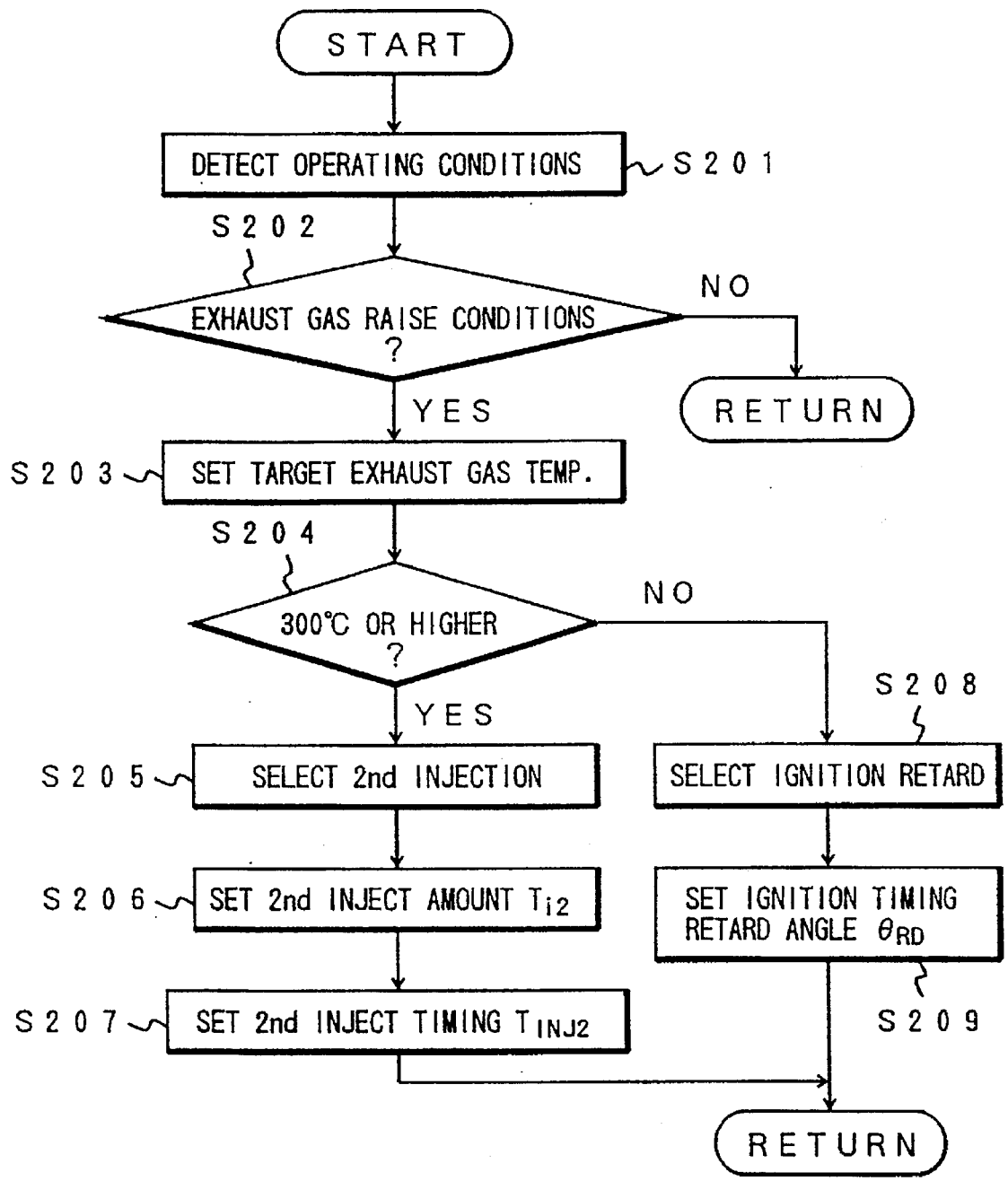
FIG. 16 is a flowchart showing the procedure of a gas temperature raising routine of the third embodiment.
Figure 17B:
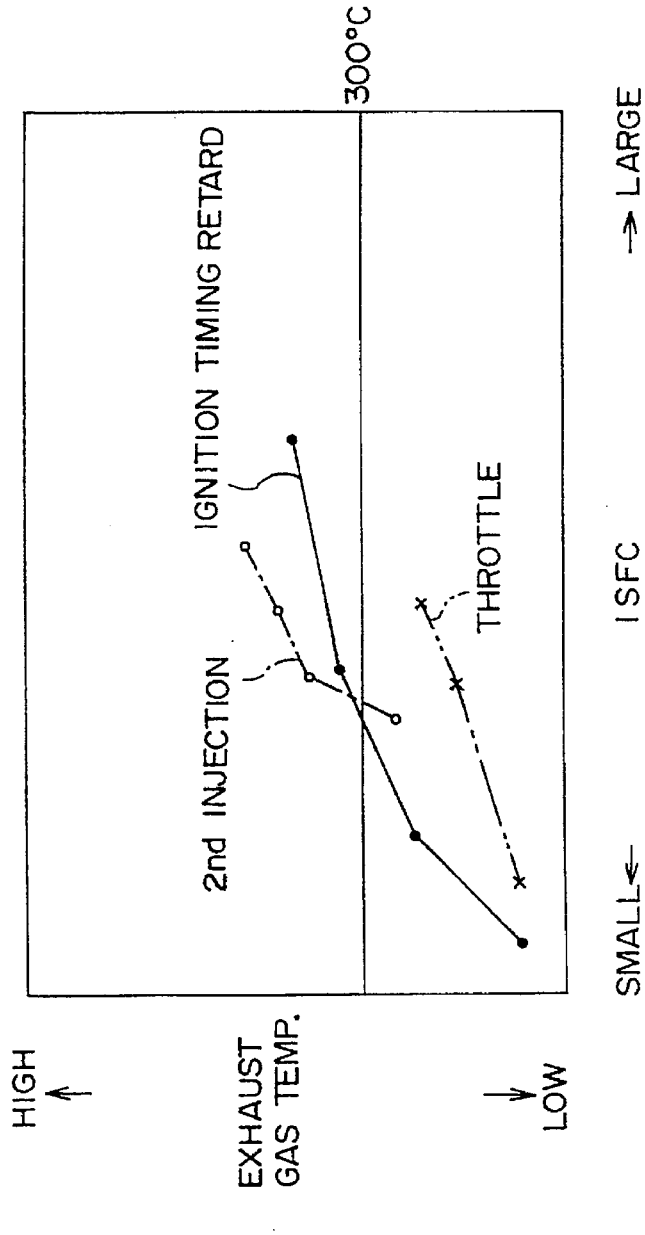
FIG. 17B is a graphical representation showing the relationship between the exhaust gas temperature and the indicated specific fuel consumption rate (ISFC), in the twice fuel injection, the ignition timing retard, and the intake throttle.

In this third embodiment, after the first (primary) fuel injection setting routine (as explained in the first embodiment with reference to FIG. 11) has been executed, the exhaust gas temperature raising routine as shown in FIG. 16 is executed. That is, after the first (primary) fuel injection, any one of the twice fuel injection and the ignition timing retarding is selected to raise the exhaust gas temperature.

In the exhaust gas temperature raising routine shown in FIG. 16, in step S201, the control detects the operating conditions on the basis of the engine speed N and the engine load (the basic fuel injection amount $T_p$). In step S202, the control discriminates whether the exhaust gas temperature raising conditions are satisfied. If no, the control passes through the routine. If yes, the control proceeds to step S203 to execute the map retrieval on the basis of the engine speed N and the basic fuel injection amount $T_p$, and further sets a target exhaust gas temperature according to the engine operating conditions.

In step S204, the control checks whether the target exhaust gas temperature set in step S203 is higher than 300° C. If yes, in step S208, the control selects the twice fuel injection method. If no, in step S208, the control selects the ignition retarding method.

When the twice fuel injection method is selected in step S205, the control sets the second fuel injection amount $T_{i2}$ and the second fuel ignition timing $T_{INJ2}$ in steps S206 and S207, respectively, passing through the routine. Further, when the ignition retard is selected in step S208, the control sets an ignition timing retard angle $\theta_{RD}$ in step S209, passing through the routine.

In this third embodiment, since the optimum processing for activating the catalyst, that is, for increasing the exhaust gas temperature can be selected according to the engine operating conditions to save fuel, it is possible to obtain the maximum exhaust gas temperature rasing effect in the minimum fuel consumption rate. Accordingly, an increase of the fuel consumption can be kept at the minimum value. Further, in this third embodiment, although an example of engine idling operation has been explained, the same processing as described above can be executed in the same way by setting the target exhaust gas temperature on the basis of the respective engine operating conditions (engine speed and load) other than the engine idling operation.

(Fourth Embodiment)

The fourth embodiment will be described hereinbelow with reference to FIGS. 18 and 19. This fourth embodiment is different from the third embodiment shown in FIG. 15 in that the signal of the exhaust gas temperature sensor 16 is feed-backed to correct the second fuel injection amount $T_{i2}$ and the ignition timing retard angle $\theta_{RD}$, so that the exhaust gas temperature can be raised to the target exhaust gas temperature under the feedback control.

Figure 18:
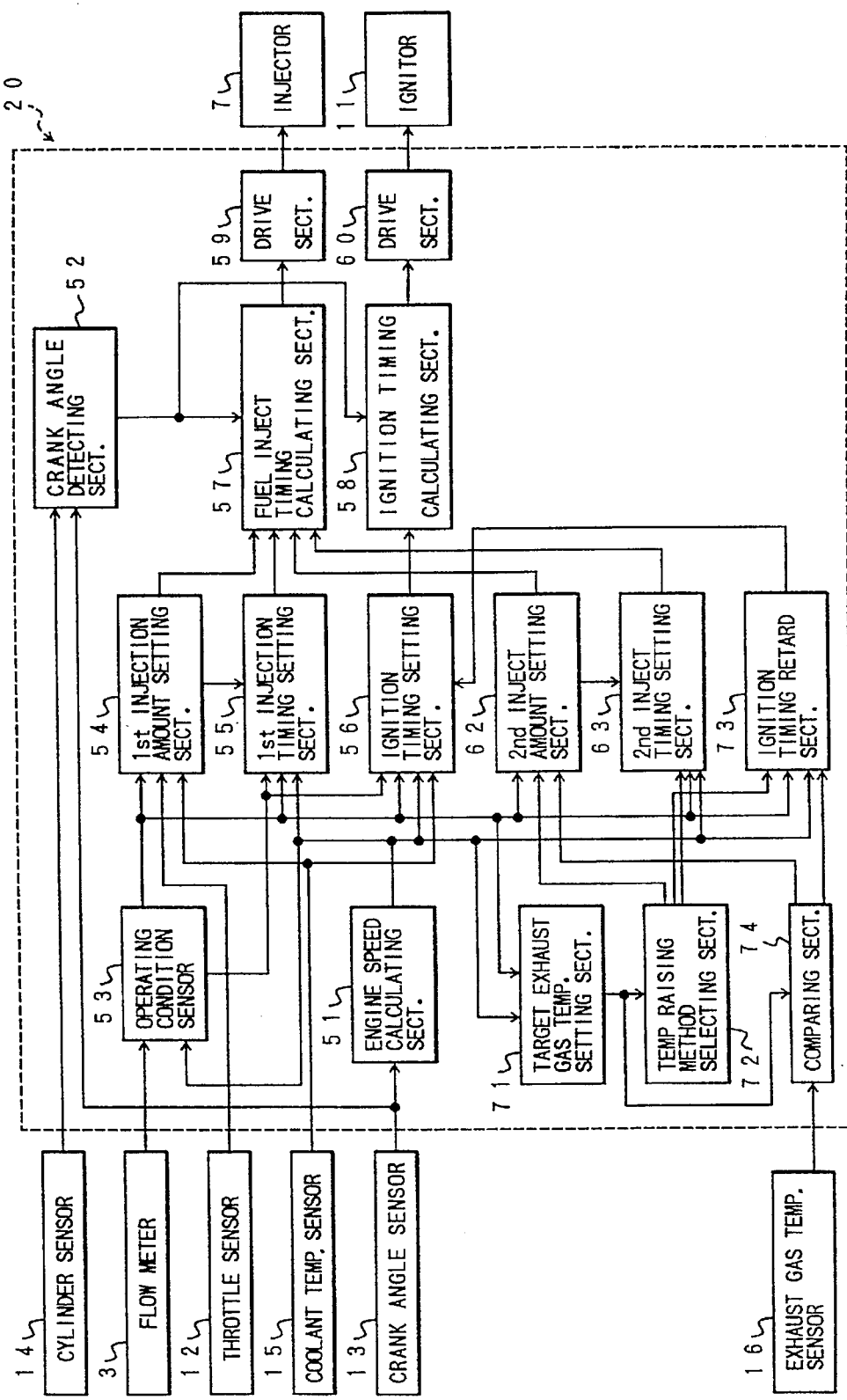
FIG. 18 is a functional block diagram of an electronic control unit showing a fourth embodiment of the catalyst activation control system.

In FIG. 18, therefore, the ECU 20 further comprises a compare section 74, and further the exhaust gas temperature sensor 16 is connected to this compare section 16.

The comparing section 74 compares the actual exhaust gas temperature detected by the exhaust gas temperature sensor 16 with the target exhaust temperature set by the target exhaust gas temperature setting section 71, and outputs an output signal indicative of the difference between the actual and target exhaust gas temperatures. On the basis of the output signal of the comparing section 74, the second injection amount $T_{i2}$ is adjusted by the second injection amount setting section 62, and the ignition timing correction angle $\theta_{RD}$ is adjusted by the ignition timing retard section 73, respectively.

Figure 19:
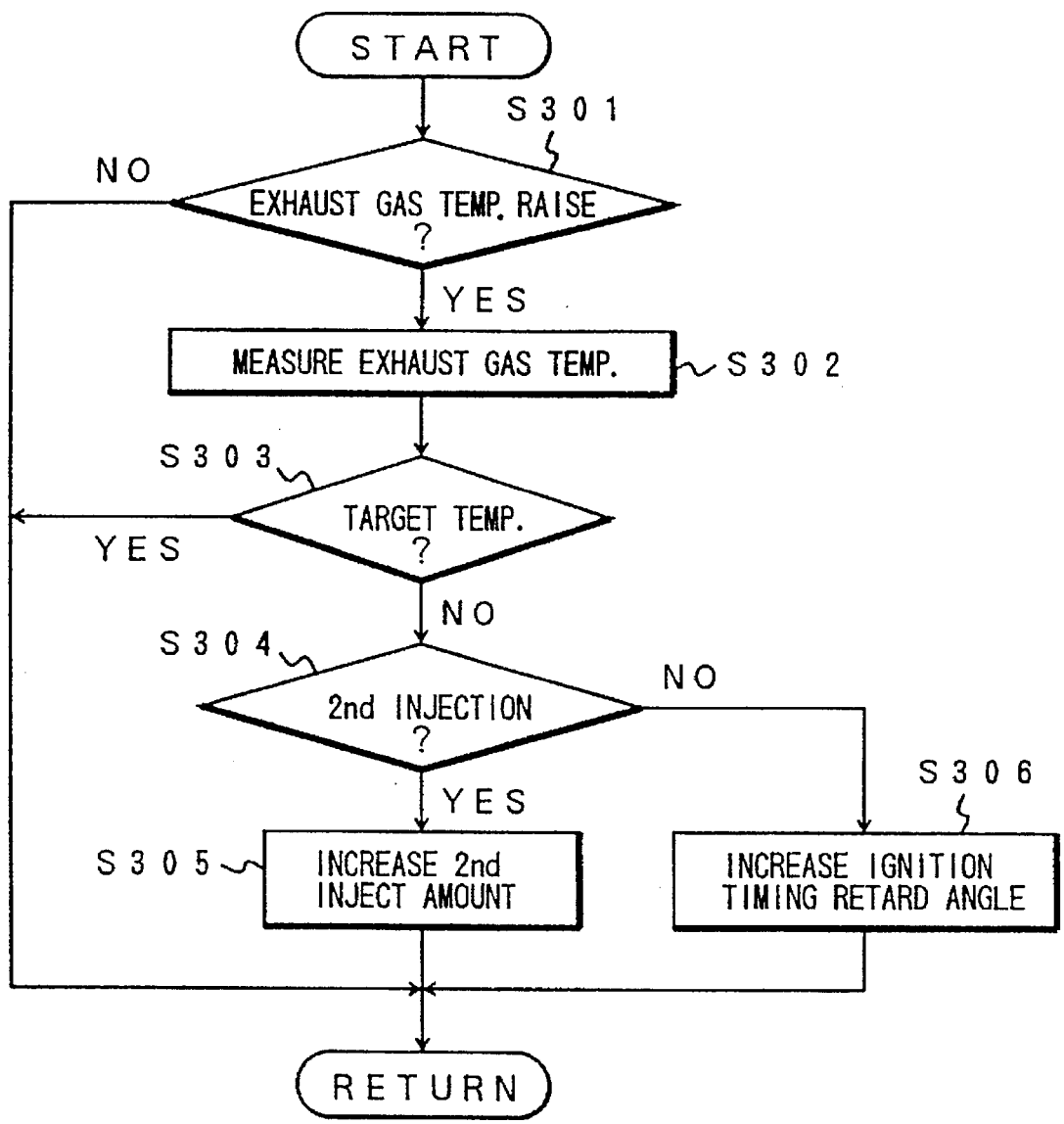
FIG. 19 is a flowchart showing the procedure of a gas temperature raising routine of the fourth embodiment.

In this fourth embodiment, after the exhaust gas raising routine as explained in the third embodiment (shown in FIG. 16) has been executed, the exhaust gas temperature feedback routine as shown in FIG. 19 is executed to control the actual exhaust gas temperature to the target value thereof within a feedback loop.

With reference to FIG. 19, in step S301, the control checks whether the exhaust gas temperature raising is executed or not. If not executed, the control passes through the routine. If executed, the control proceeds to step S302 to measure the actual exhaust gas temperature on the basis of the signal of the exhaust gas temperature sensor 16.

Further, in step S303, the control checks whether the actual exhaust gas temperature measured in step S302 reaches the target exhaust gas temperature. If reaches the target exhaust gas temperature, the control passes through the routine. If not reaches the target value, in step S304, the control checks whether the selected exhaust gas raising method is the twice fuel injection or not.

If the twice fuel injection method is selected, in step S305, the control increases the second fuel injection amount $T_{i2}$, passing through the routine. If the ignition timing retard method is selected, in step S306, the control increases the ignition timing retard angle $\theta_{RD}$, passing through the routine.

As described above, in this fourth embodiment, it is possible to converge the exhaust gas temperature to the target value quickly, so that the exhaust gas temperature can be raised effectively at a high speed for activating the catalyst 5.

(Fifth Embodiment)

The fifth embodiment will be described hereinbelow with reference to FIGS. 20 and 21 and FIG. 22A and 22B. This fifth embodiment is different from the third embodiment shown in FIG. 15 in that after the second fuel injection, a third fuel injection is further executed according to the activation conditions of the catalyst.

Figure 20:
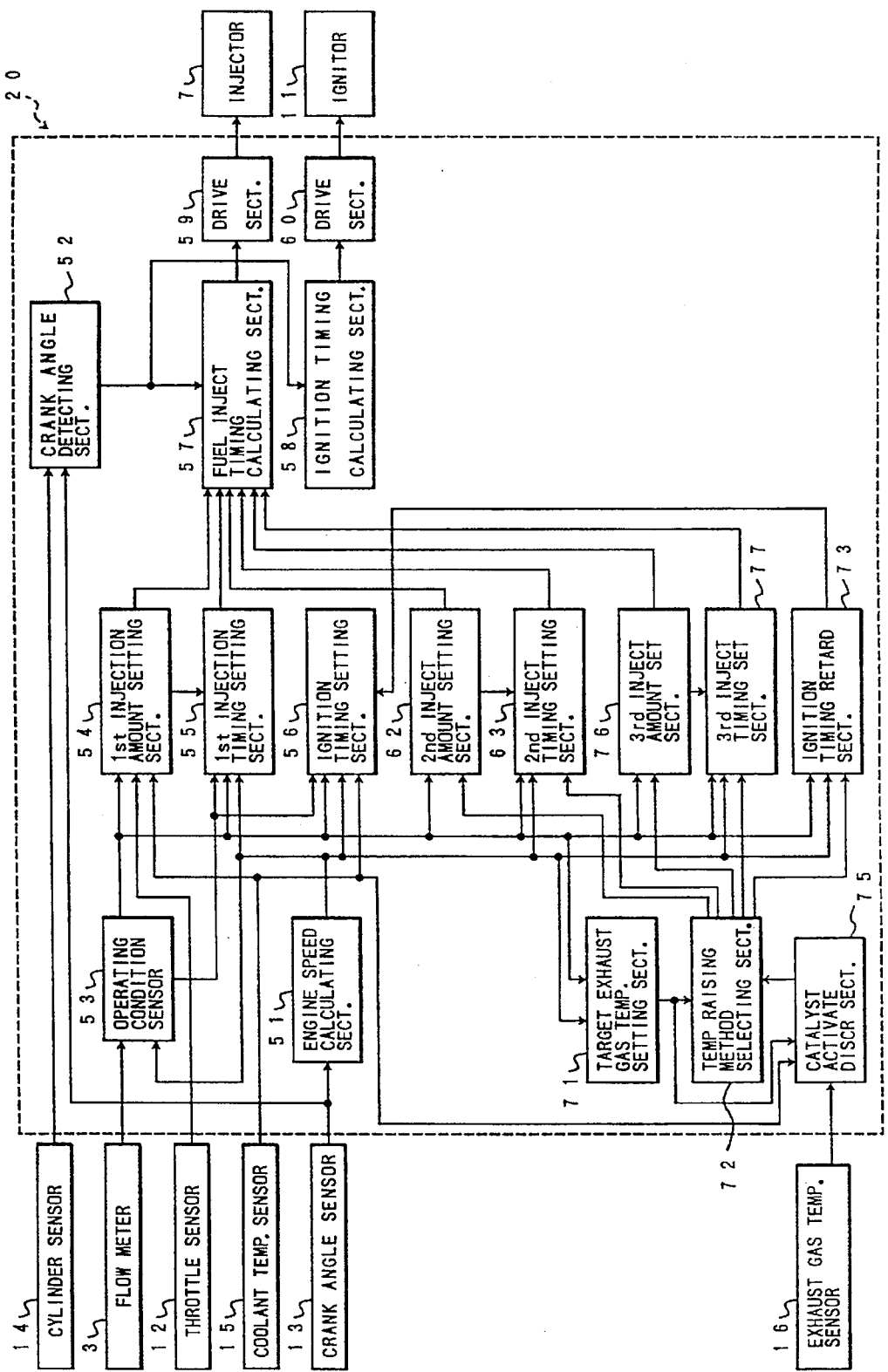
FIG. 20 is a functional block diagram of an electronic control unit showing a fifth embodiment of the catalyst activation control system.

In FIG. 20, therefore, the ECU 20 further comprises a catalyst activation discriminating section 75, a third injection amount setting section 76, a third injection timing setting section 77, in addition to the third embodiment shown in FIG. 15. Further, the functions of the target exhaust gas temperature setting section 71 and the temperature raising method selecting section 72 are slightly modified.

The catalyst activation discriminating section 75 discriminates whether the catalyst reaches the activation temperature or not on the basis of the signal of the exhaust gas temperature sensor 16, and outputs the discriminated result to the temperature rasing method selecting section 72.

On the other hand, the target exhaust gas temperature setting section 71 sets the target exhaust gas temperature according to the current engine operating conditions (e.g., the engine starting operation, the steady state operation, etc.). This target exhaust gas temperature is usually set to 400° C. or higher for early activation of the catalyst, when the engine 1 is started at a low temperature. On the other hand, when the engine 1 is not started but operated stably, as already explained in the fourth embodiment, the target exhaust gas temperature is set to a value lower than 400° C., which is stored as a map by setting the engine speed N and the basic fuel injection amount $T_p$ as parameters in consideration of the characteristics of the catalyst 5.

The temperature raising method selectting section 72 selects any one of the thrice fuel injection method, twice fuel injection method and the ignition timing retard method, to raise the exhaust gas temperature, according to the target exhaust gas temperature set by the target exhaust gas setting section 71. In this fifth embodiment, when the target exhaust gas temperature is set to a value 400° C. or higher as when the engine is started at a low temperature (low temperature start), the thrice fuel injection is selected to raise the exhaust gas temperature effectively. On the other hand, when the target exhaust gas temperature is set to a value lower than 400° C. but higher than 300° C., the twice fuel injection method is selected. Further, when the target exhaust gas temperature is set to a value lower than 300° C., the ignition timing retard method is selected.

Figure 22A:
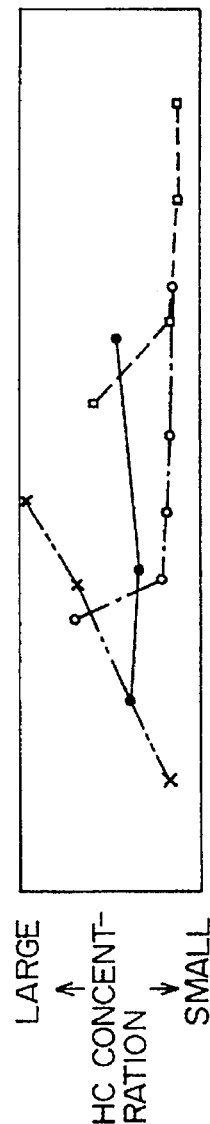
FIG. 22A is a graphical representation showing the relationship between the HC concentration and the indicated specific fuel consumption rate (ISFC), in the twice fuel injection, the trice fuel injection, the ignition timing retard, and the intake throttle.
Figure 22B:
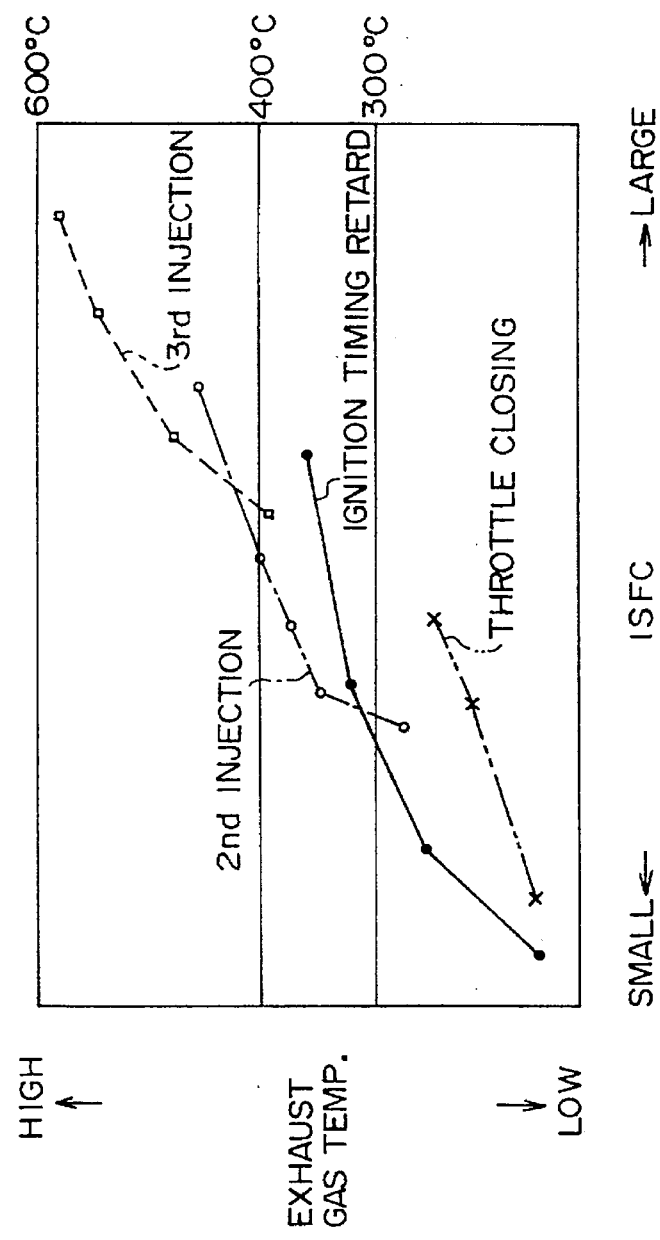
FIG. 22B is a graphical representation showing the relationship between the exhaust gas temperature and the indicated specific fuel consumption rate (ISFC), in the twice fuel injection, the thrice fuel injection, the ignition timing retard, and the throttle closing.

FIG. 22A shows the relationship between the indicated specific fuel consumption rate ISFC (the abscissa) and the HC concentration (the ordinate), and FIG. 22B shows the relationship between the indicated specific fuel consumption rate ISFC (the abscissa) and the exhaust gas temperature (the ordinate) both in low temperature start operation by way of example, in which the solid lines designate the method of retarding the ignition timing; the alternate long and short lines designate the method of twice fuel injection; the dashed lines designate the method of thrice fuel injection; and the alternate long and two short dashed lines designate the method of throttling the intake pipe. FIGS. 22B indicates that the thrice fuel injection is effective to raise the exhaust gas temperature to a relatively high value, as compared with the twice fuel injection method and the ignition timing retarding method.

As shown in FIG. 22B, in this fifth embodiment, since the thrice fuel injection is adopted when the engine 1 is started at a low temperature, it is possible to obtain the maximum exhaust gas temperature raising effect. Further, other than the low temperature starting, any one of the twice fuel injection or the ignition timing retard is adopted to keep the fuel consumption rate at a low level.

Further, when the temperature rasing method selecting section 72 selects the thrice fuel injection, the third injection amount setting section 76 and the third injection timing setting section 7Y set the third fuel injection amount $T_{i3}$ and the third fuel injection timing $T_{INJ3}$, respectively in addition to the second fuel injection amount $T_{i2}$ and the second fuel injection timing $T_{INJ2}$ set by the second injection amount setting section 62 and the second injection timing setting section 63, respectively.

In this case, the third injection amount $T_{i3}$ is set to equal to or slightly larger than the second injection amount $T_{i2}$, and the third injection timing $T_{INJ3}$ is set at such an firing timing that the third injection fuel can be injected into the cylinder immediately before the second injection fuel has been fired completely. In practice, the third fuel injection timing $T_{INJ3}$ is set between 90 and 120 degrees after the top dead center, in comparison with the second fuel injection timing $T_{INJ2}$ between 30 and 60 degrees after the top dead center.

Figure 11:
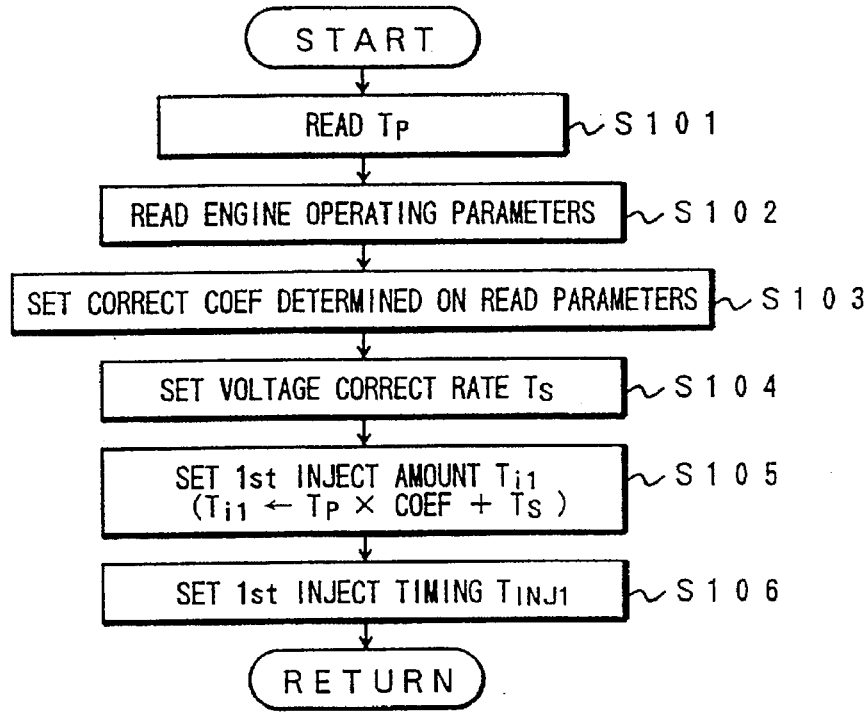
FIG. 11 is a flowchart showing the procedure of the first fuel injection setting routine of the first embodiment.
Figure 21:
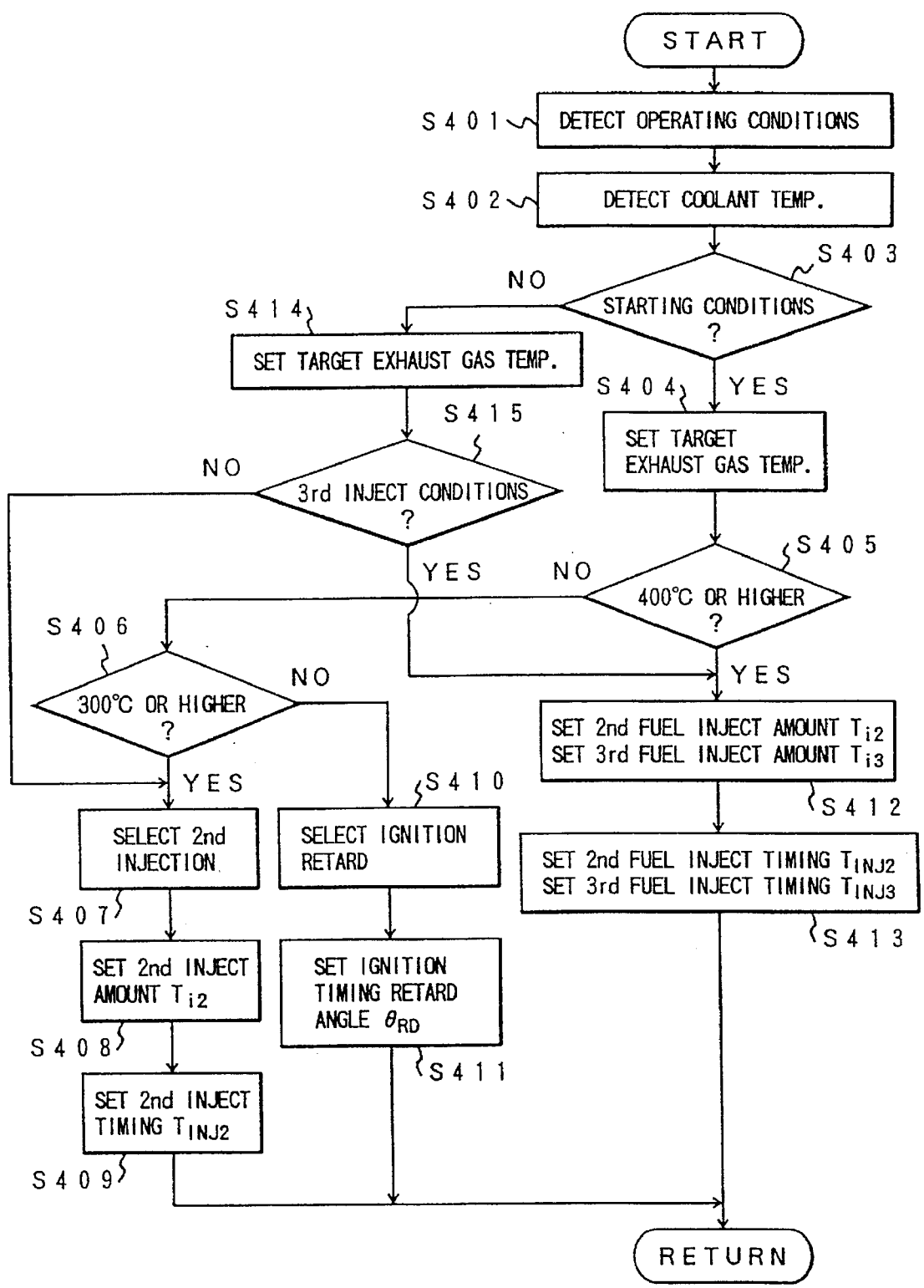
FIG. 21 is a flowchart showing the procedure of a gas temperature raising routine of the fifth embodiment.

In this fifth embodiment, after the first fuel injection setting routine (as already explained in the first embodiment with reference to FIG. 11) has been executed, the exhaust gas temperature raising routine as shown in FIG. 21 is executed. That is, after the first fuel injection, any one of the thrice fuel injection, the twice fuel injection and the ignition timing retarding is selected to raise the exhaust gas temperature according to the setted target exhaust gas temperature.

In the exhaust gas temperature raising routine shown in FIG. 21, in step S401, the control detects the engine operating conditions on the basis of the engine speed N and the basic fuel injection amount $T_p$. In step S402, the control detects the coolant temperature on the basis of the signal of the coolant temperature sensor 15. Further, in step S403, the control discriminates whether the engine starting conditions are established or not.

If the engine starting conditions are established, in step S404, the control sets the target exhaust gas temperature. In step S405, the control checks whether the set target exhaust gas temperature is equal to or higher than 400° C. or not. Further, if the engine starting conditions are not established in step S403, the control proceeds from step S403 to step S414 to set the target exhaust gas temperature.

In step S405, if the target exhaust gas temperature is lower than 400° C. (the ordinary engine starting), the control further checks whether the target exhaust gas temperature is equal to or higher than 300° C. As a result, if 300° C. or higher in step S406, in step S407 the control selects the twice fuel injection. In steps S408 and S409, the control sets the second fuel injection amount $T_{i2}$ and the second fuel injection timing $T_{INJ2}$, respectively, passing through the routine. If lower than 300° C. in step S406, in step S410 the control selects the ignition retard. In step S411, the control sets the ignition timing retard rate $\theta_{RD}$, passing through the routine.

On the other hand, in step S405, if the target exhaust gas temperature is equal to or higher than 400° C. (cool starting), the control proceeds from step S405 to step S412. In step S412, the control sets the second fuel injection amount $T_{i2}$ and the third fuel injection amount $T_{i3}$. Further in step S413, the control sets the second fuel injection timing $T_{INJ2}$ and the third fuel injection timing $T_{INJ3}$, respectively, passing through the routine.

Accordingly, even when the engine 1 is started at a low temperature, since the exhaust gas temperature can be raised quickly, the catalyst 5 can be activated fast, so that it is possible to remarkably reduce exhaust gas exhausted without purification.

Further, in the normal engine operation, in step S414, after the control sets the target exhaust gas temperature, in step S415, the control checks whether the thrice fuel injection is necessary at the set target exhaust gas temperature. If yes, the control proceeds to step S412 to set the second fuel injection amount $T_{i2}$ and the third fuel injection amount $T_{i3}$. Further in step S413, the control sets the second fuel injection timing $T_{INJ2}$ and the third fuel injection timing $T_{INJ3}$, respectively, passing through the routine. Further, in step S415, the control discriminates that thrice fuel injection is not necessary for suppression of fuel consumption rate, the control proceeds to steps S408 and S409 to set the second fuel injection amount $T_{i2}$ and the second fuel injection timing $T_{INJ2}$, respectively, passing through the routine. As a result, it is possible to reduce the fuel consumption rate, while activating the catalyst 5.

As described above, in the above-mentioned embodiments, since the second fuel is injected from the early period to the middle period of the expansion stroke of the first (primary) combustion in such a way that the second injection fuel can be fired by the flame propagation of the primary fuel, it is possible to fire the second injection fuel without depending upon re-ignition (the possibility of malfiring is large), so that the exhaust gas temperature can be raised stably for catalyst activation.

Further, in the present invention, since any one of the twice fuel injection and the ignition timing retard method (for retarding the ignition timing of the first injection fuel) is selectively executed according to the engine operating conditions, and furthermore since the thrice fuel injection after the second fuel injection is selectively executed according to the activation condition of the catalyst 5, in such a way that the third injection fuel can be fired by the flame propagation of the second injection fuel, it is possible to realize the early activation of the catalyst 5, while keeping the fuel consumption rate at as low a level as possible.

Further, in the third or more additional fuels are injected into each engine cylinder, after the primary combustion, according to the engine operating conditions (e.g., as when an engine is started at a low temperature) and the catalyst characteristics (e.g., the target exhaust gas temperature is as high as 400° C.), it is possible to activate the catalyst 5 more quickly and effectively, while keeping the fuel consumption rate at as low as possible.

(Sixth Embodiment)

The sixth embodiment will be described hereinbelow with reference to FIGS. 23 to 26. The feature of this sixth embodiment is to always monitor the combustion condition of the primary combustion in order to prevent the misfire of the second injection fuel for protection of the catalyst 5. More in details, in the case where an abnormal (a low heat generation) combustion of the first (primary) injection fuel is detected, the second fuel injection is interrupted. Further, the first fuel combustion is shifted from the stratified combustion to the uniform combustion, by changing the fuel injection timing, the fuel injection amount and the ignition timing for the first injection fuel, in order to protect the catalyst 5 from being deteriorated by raw gas.

Figure 6:
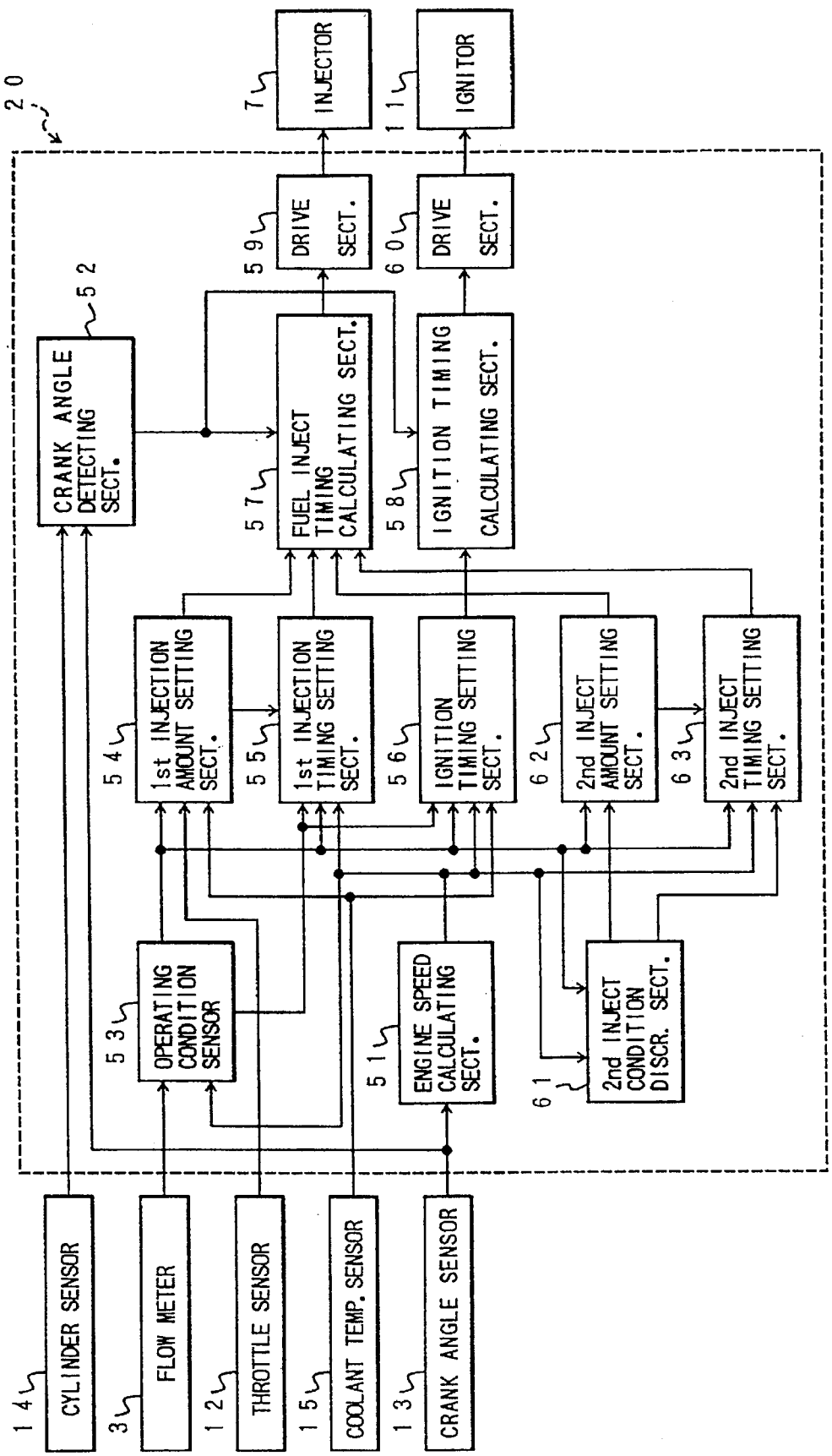
FIG. 6 is a functional block diagram of an electronic control unit showing a first embodiment of the catalyst activation control apparatus according to the present invention.

Therefore, the sixth embodiment is different from the first embodiment shown in FIG. 6 in that the cylinder pressure sensor 9, a cylinder pressure detecting section 64, a heat generation rate calculating section 65, an abnormality discriminating section 66, a combustion mode changing section 67, an alarm generating section 68, a driver 69, and an alarm device 80 are provided, in addition to the elements of the first embodiment shown in FIG. 6.

More in details, the cylinder pressure detecting section 64 samples the signals from the cylinder pressure sensor 9 for each predetermined time period in response to a first trigger signal (the first fuel injection signal) outputted from the drive section 59 to the injector 7, to measure the inner pressure of the cylinder when the first injected fuel has been ignited. The measured cylinder inner pressure is outputted to the heat generation calculating section 65.

The heat generation calculating section 65 calculates the heat generation rate by the combustion of the first injection fuel on the basis of the cylinder inner pressure measured by the cylinder inner pressure sensor 64 (after the first fuel injection) and the signal applied by the crank angle sensor 13. The heat generation rate can be calculated with reference to a pressure-stroke diagram and on the basis of various parameters such as gas mass within the combustion chamber, the temperature of the cylinder wall surface, the cylinder inner pressure, the ambient temperature and pressure, etc. Further, a thermal loss to the outside is reduced from the calculated heat to obtain the quantity of heat generated by the first fuel combustion.

The abnormality discriminating section 66 discriminates whether the combustion of the first injection fuel is normal or not on the basis of the heat generation rate calculated by the heat generation calculating section 65. In the case where the combustion of the first fuel injection amount $T_{i1}$ is abnormal under the twice fuel injection conditions, the abnormality discriminating section 66 outputs a command indicative of interruption of the twice fuel injection to the injection timing calculating section 57, and further resets the second fuel injection timer. In addition, the abnormality discriminating section 68 outputs an abnormal signal to the combustion mode changing section 67 to change the succeeding combustion by the first (primary) fuel injection from the stratification combustion to the uniform combustion. Further, the abnormal signal is outputted from the abnormality discriminating section 66 to the alarm generating section 68 to activate the alarm device 80 via the drive section 69.

In the abnormality discriminating section 66 for discriminating whether the combustion by the first fuel injection is normal or not, the combustion abnormality can be discriminated by using heat generation diagrams obtained for each cycle. In this case, the abnormality can be discriminated in the cycle during which the generated heat is lower than a predetermined reference value. On the other hand, it is possible to use a timing chart as shown in FIG. 26. More in details, when the heat generation rate at a predetermined crank angle in the expansion stroke of the primary combustion is smaller than the reference value $Q_{REF}$ (at which the quantity of generated heat is large enough to fire the second injection fuel), the primary combustion is discriminated as being abnormal.

Whenever the abnormality discriminating section 66 discriminates an abnormality, the combustion mode changing section 67 outputs a correction command to the first injection amount setting section 54, the first injection timing setting section 55, and the ignition timing setting section 56. In response to the correction command, the first injection amount setting section 54 corrects the first injection amount $T_{i1}$ to an appropriate amount; the first injection timing setting section 55 advances the angle of the first fuel injection timing largely; and the ignition timing setting section 56 changes the fuel ignition timing, so that the combustion mode of the succeeding fuel injection can be changed from the stratified combustion to the uniform combustion.

Figure 24:
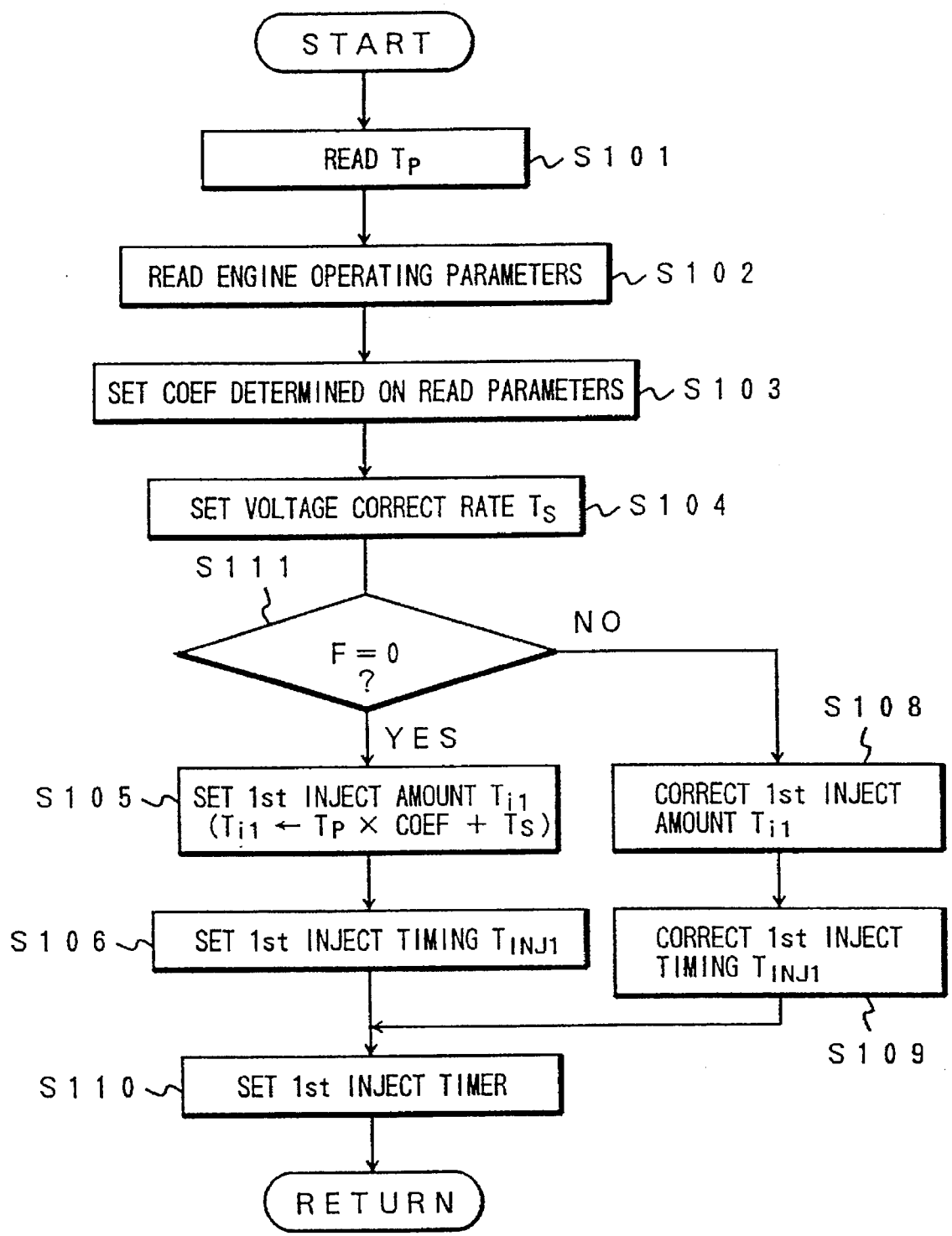
FIG. 24 is a flowchart showing the procedure of a first fuel injection amount setting routine of the sixth embodiment.

The operation of the ECU 20 will be explained with reference to a first fuel injection set routine shown in FIG. 24.

First, in step S101, the control reads the basic fuel injection amount $T_p$ on the basis of a predetermined address of the RAM 23. In step S102, the control reads the engine operating condition parameters such as the signals of the throttle sensor 12, the coolant temperature sensor 15, and the like.

Further, in step S103, the control sets a coefficient COEF for correcting the basic fuel injection amount $T_p$, which is determined according to various engine operating conditions read in the step S102. In step S104, the control further sets the voltage correction rate $T_s$ on the basis of a battery voltage $V_B$, proceeding to step S111.

In the step S111, the control checks whether the combustion by the primary fuel injection in the preceding cycle is normal or not, with reference to a combustion status discrimination flag F which is set and reset (cleared) by a combustion status detecting routine (described later).

If F=0, that is, if the combustion status is normal, the control proceeds from the step S111 to the steps S106 and after setting the normal fuel injection amount and the normal fuel injection timing. On the other hand, if F=1, that is, if the combustion status is abnormal, the control proceeds from the step S111 to the steps S108 and after correcting the first fuel injection amount and timing.

That is, when the combustion of the primary injection fuel is normal in the preceding cycle, in step S105, the control sets the first injection amount $T_{i1}$ ($T_{i1} \leftarrow T_p \times COEF + T_s$) by multiplying the basic fuel injection amount $T_p$ read in step S101 by the correction coefficient COEF set in step S103 and further by adding the voltage correction rate $T_s$ set in step S104. Further, in step S106, the control sets the first fuel injection timing $T_{INJ1}$ according to the combustion method, passing through the routine.

On the other hand, when the combustion of the primary fuel injection is abnormal in the preceding cycle, in step S108 the control reads the first injection amount correction value ΔK (which is set by the combustion status detect routine (described later)) from the RAM 23 to cope with the abnormal combustion of the primary fuel injection. On the basis of the read first injection amount correction value ΔK, the first injection amount $T_{i1}$ is corrected as ($T_{i1} \leftarrow T_p \times$ COEF$\times$ΔK+$T_s$), proceeding to the step S109.

In step S109, in the same way as above, the control reads the first injection timing correction value ΔTM (which is set by the combustion status detect routine (described later)) from the RAM 23 to cope with the abnormal combustion of the first injection fuel. On the basis of the read first injection timing correction value ΔTM, the first injection timing $T_{INJ1}$ is corrected as ($T_{INJ1} \leftarrow T_{INJ1} - \Delta TM$), proceeding to the step S110.

In step S110, the corrected first injection amount $T_{i1}$ and the first injection timing $T_{INJ1}$ are both set to the first fuel injection timer, passing through the routine.

Further, the second fuel injection setting routine is executed in quite the same way as that shown in FIG. 12.

Upon end of the respective routines, the first injection timer is started when the cylinder to be injected reaches a predetermined reference crank angular position (e.g., the engine top dead center), to inject the first fuel injection into the cylinder. In the same way, the fuel ignition timer is started when the cylinder to be ignited reaches the predetermined reference crank angular position, to ignite the mixture in the combustion chamber, to start the primary combustion by the first fuel injection.

Figure 25:
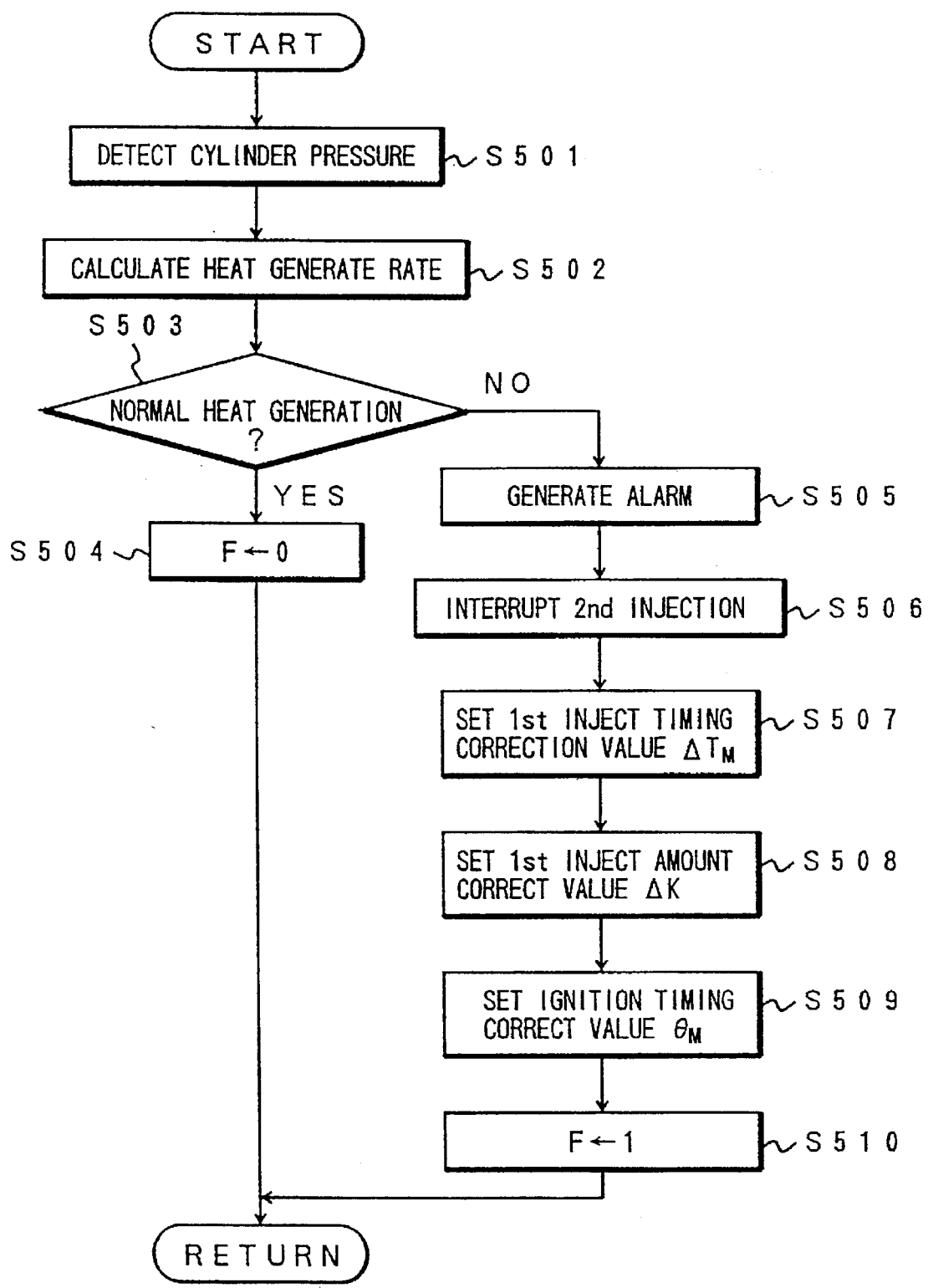
FIG. 25 is a flowchart showing the procedure of a combustion state detecting routine of the sixth embodiment.

Here, the combustion status of the primary fuel by the first fuel injection is always monitored by the combustion status detecting routine as shown in FIG. 25.

In this combustion status detecting routine, in step S501, the control detects the cylinder inner pressure. In step S502, the control calculates the heat generation rate. Further, in step S503, the control discriminates whether the primary combustion of the first fuel injection is normal or not on the basis of the heat generation rate. In this case, the heat generation rate diagram obtained for each engine cycle is used. Alternatively, it is also possible to discriminate the abnormality by checking whether the heat generation rate at a predetermined crank angle in the expansion stroke of the primary combustion is high enough to fire the second fuel injection. If normal, the control proceeds to step S504 to clear (F←0) the combustion status discrimination flag indicative of the normal primary combustion, passing through the routine.

Further, if the abnormality of the primary combustion by the first fuel injection is discriminated, the control proceeds from the step S503 to step S505 to generate an alarm to a driver. Further, in step S506, control resets the second injection timer to interrupt the second fuel injection. Further, in step S507 and after, the control sets respective correction values for the first injection timing, the first injection amount, and the ignition timing in such a way that the primary combustion by the first fuel injection can be changed from the stratified combustion to the uniform combustion.

More in details, in step S507, the control sets the first injection timing correction value ΔTM to change the stratified combustion to the uniform combustion by remarkably advancing the angle of the first injection timing $T_{INJ1}$. Further, in step S508, the control sets the first injection amount correction value ΔK to optimize the first injection amount $T_{i1}$. Further, in step S509, the control sets the ignition timing retard angle $\theta_{RD}$ by retrieving from a map obtained on the basis of the engine speed N and the basic fuel injection amount $T_p$. Finally, in step S510, the control sets the combustion status discriminate flag (F←1) indicative of the abnormal primary combustion, passing through the routine.

As described above, when the twice fuel injection conditions are securely satisfied and further when the first injection fuel injected at the latter period in the compression stroke is ignited normally under the stratified combustion (in the low fuel consumption rate and the better exhaust gas characteristics), the second fuel injection timer starts to inject the second fuel at such an optimum timing that the second injection fuel can be injected immediately before the primary combustion by the first injection fuel ends. As a result, the combustion by the second injection fuel can be started by the flame propagation of the primary combustion, without need of re-ignition.

This second combustion is almost consumed to raise the exhaust gas temperature without moving the piston. In addition, since the second injection timing is optimized, it is possible to prevent the smoke from being generated due to the insufficient fuel diffusion or HC from being increased due to an excessive fuel diffusion, with the result that the exhaust gas temperature can be raised stably for activating the catalyst 5.

On the other hand, when the primary combustion by the first injection fuel is abnormal under the engine operating range in which the twice fuel injection conditions are satisfied, the second fuel injection is immediately interrupted, so that it is possible to prevent raw gas from being exhausted as it is and further prevent the catalyst from being overheated or degraded or damaged, which would otherwise be caused by the misfire of the second fuel injection. Further, since the fuel injection timing of the primary combustion in the succeeding cycle is largely advanced and further since the combustion parameters such as the fuel injection amount and the ignition timing are changed, the combustion mode of the primary fuel is changed from the stratified combustion to the uniform combustion. As a result, although the fuel consumption rate slightly increases, even if the abnormal combustion occurs, it is possible to operate the engine 1 in safe without any trouble.

In addition, in the sixth embodiment, since the primary combustion status is discriminated on the basis of the heat generation rate at a predetermined crank angular position at the expansion stroke of the engine 1, that is, by checking that the generated heat quantity is large enough to fire the second injection fuel, any abnormality (e.g., a momentary abnormality of which frequency is very low) can be detected and corrected, so that it is possible to increase the reliability of the catalyst activation control system.

(Seventh Embodiment)

Figure 27:
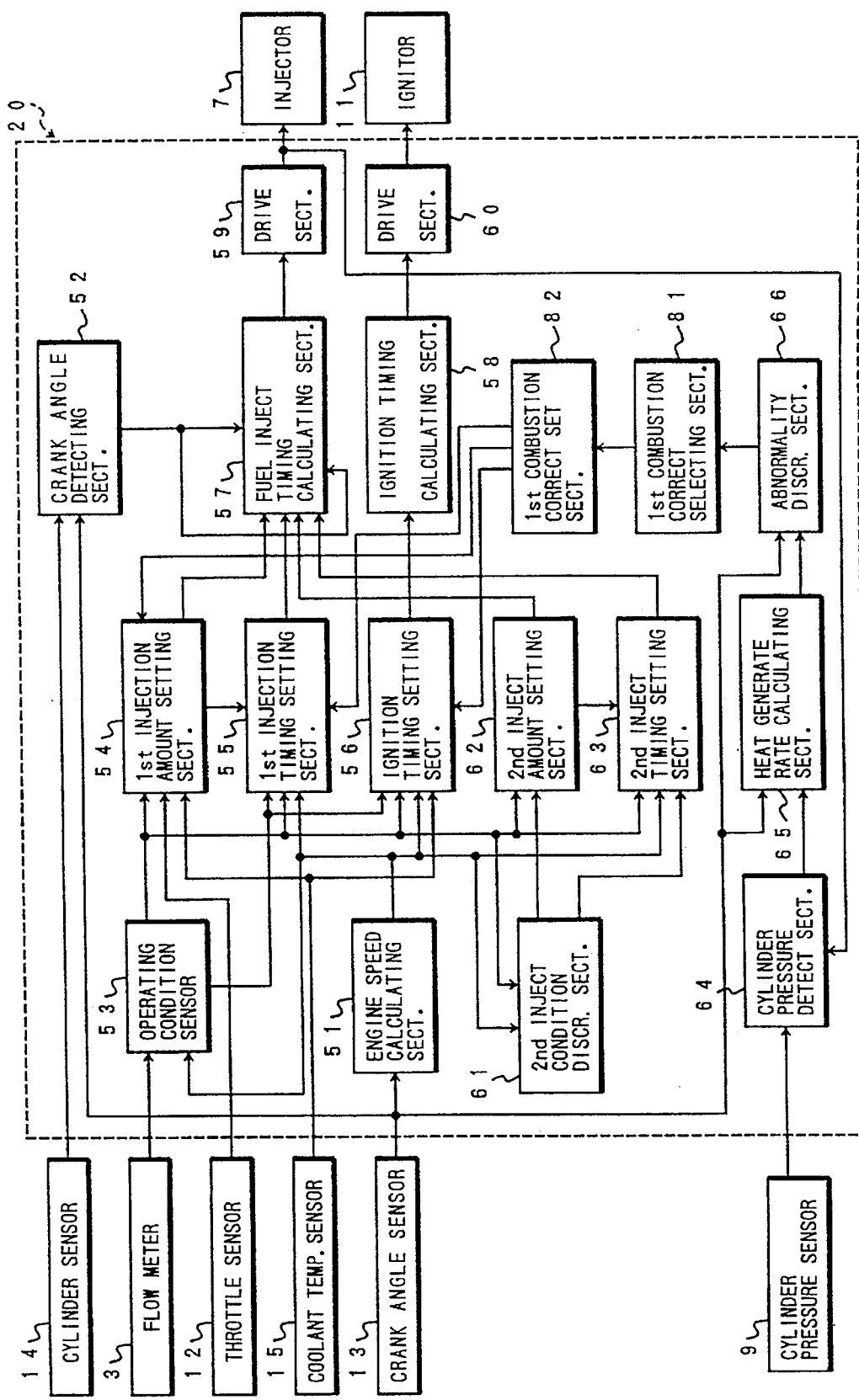
FIG. 27 is a functional block diagram of an electronic control unit showing a seventh embodiment of the catalyst activation control system.
Figure 28:
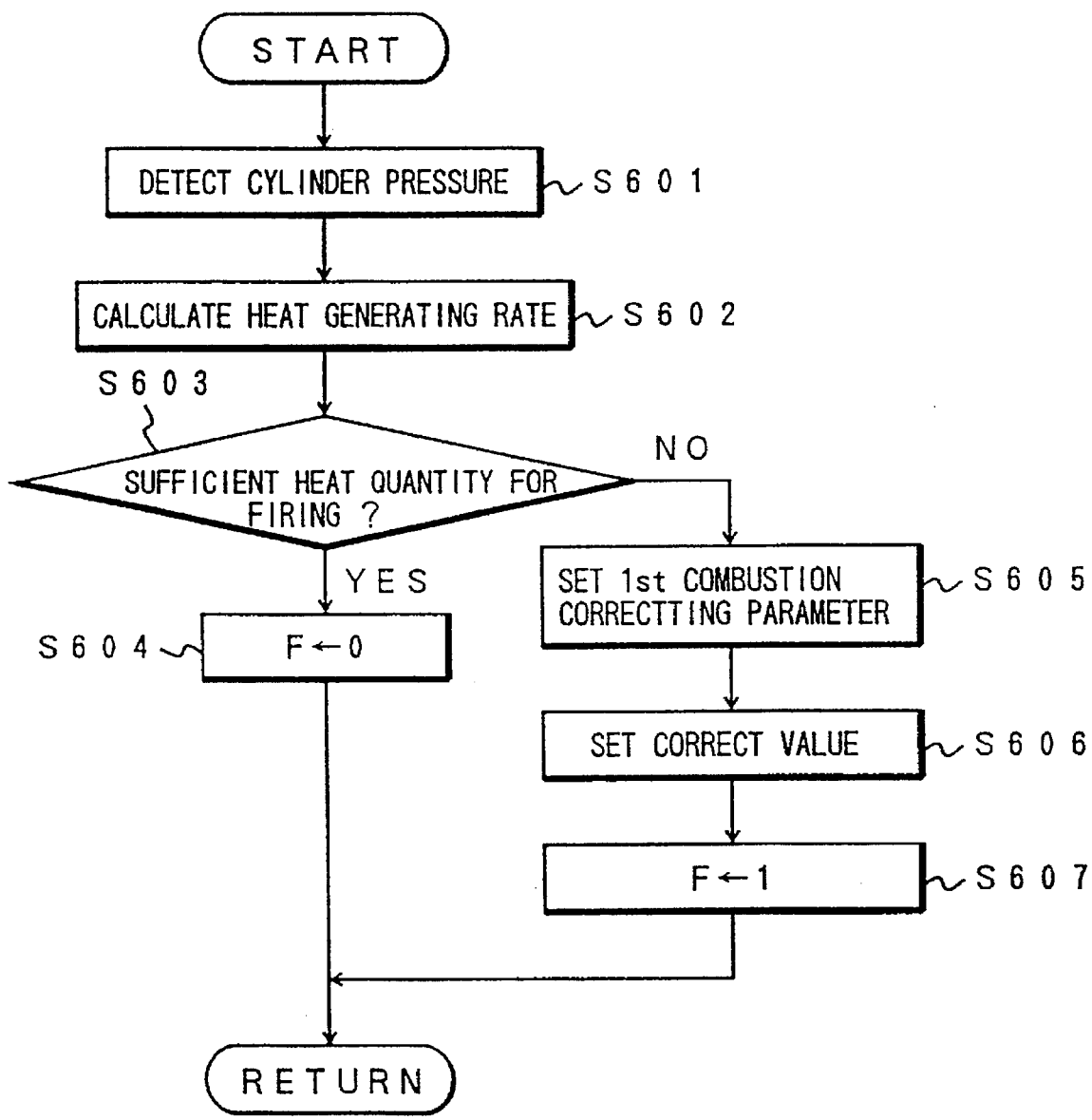
FIG. 28 is a flowchart showing the procedure of a combustion status detecting routine of the seventh embodiment.

The seventh embodiment will be described hereinbelow with reference to FIGS. 27 to 28. This embodiment is different from the sixth embodiment in that when the primary combustion is abnormal (the heat quantity is not sufficient), the amount of the primary combustion is increased without changing the stratified combustion to the uniform combustion. In more detail, the feature of this embodiment is such that when a sufficient heat quantity for firing the second injection fuel cannot be obtained by the primary combustion of the first injection fuel under the operating conditions which satisfy the twice fuel injection, the quantity of heat of the primary combustion in the succeeding cycle is increased to securely fire the second injection fuel, while keeping the stratified combustion (without changing to the uniform combustion).

Figure 23:
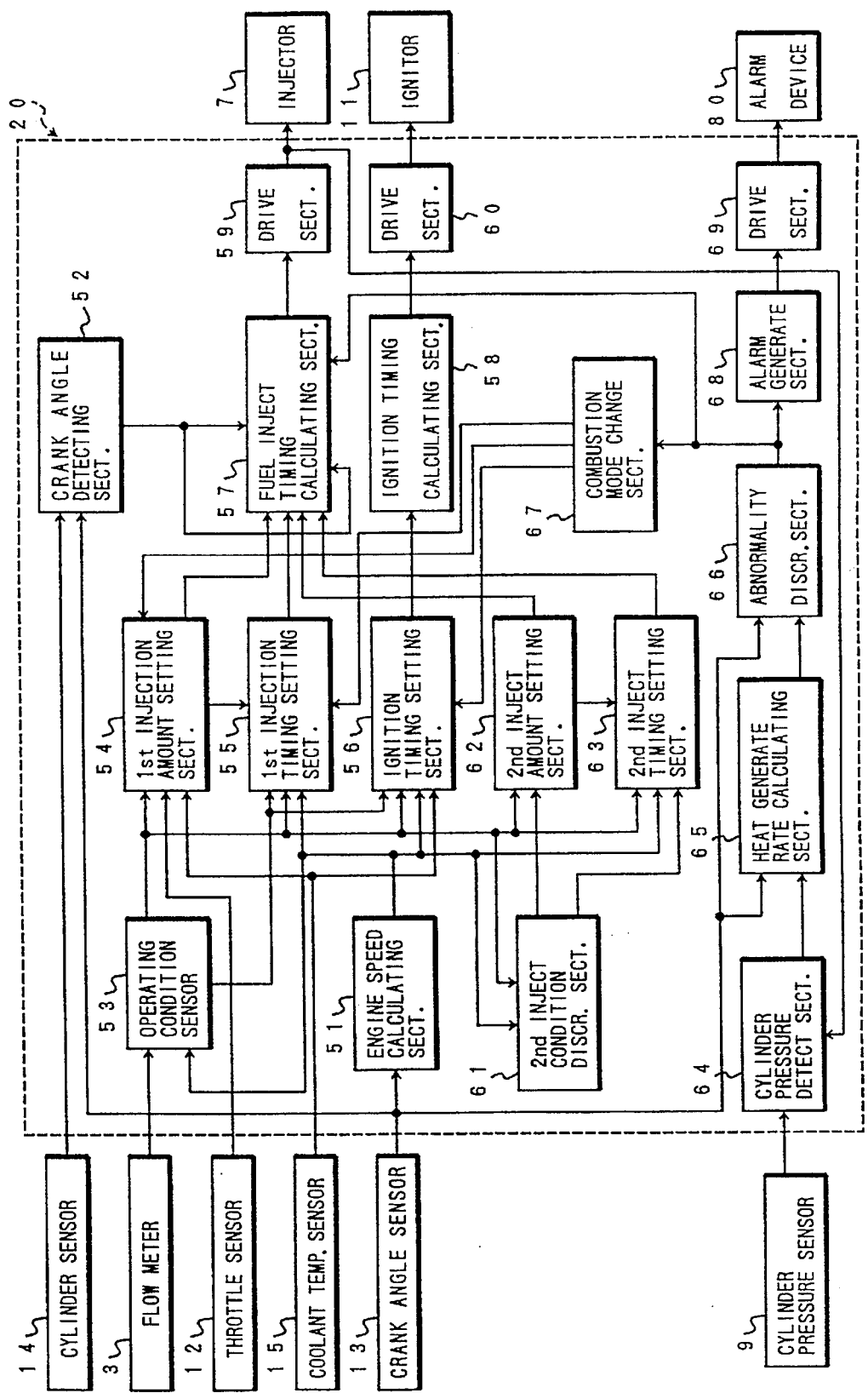
FIG. 23 is a functional block diagram of an electronic control unit showing a sixth embodiment of the catalyst activation control system.

Therefore, the ECU 20 of this embodiment further comprises a first combustion correction selecting section 81 for selecting parameters for correcting the primary combustion and a first combustion correction setting section 82 for setting the correction values of the selected parameters, instead of the combustion mode changing section 67, in addition to the elements of the sixth embodiment shown in FIG. 23. Further, in this embodiment, since no alarm is generated, the alarm related elements (the alarm generating section 68, the driver 69 and the alarm device 80) are omitted.

In this embodiment, when the abnormality discriminating section 66 discriminates that the primary combustion status is abnormal; that is, the heat generation rate at a predetermined crank angular position in the expansion stroke of the main combustion is lower than a reference value $Q_{REF}$ (at which the generated heat quantity is large enough to fire the second injection fuel), the abnormality discriminating section 66 outputs a command indicative of abnormality to the first combustion correction selecting section 81 to increase the heat generation quantity of the primary combustion by the succeeding first fuel injection, without interrupting the second fuel injection and generating an alarm.

In response to the abnormality command, the first combustion correction selecting section 81 selects changes of the parameters related to the primary combustion. These parameters are an increment value of the first fuel injection amount, the advancing or retarding angle of the ignition timing, the change of the first injection timing. In this case, a single or a plurality of the parameters are selected according to the heat generation rate of the primary combustion. The first combustion correction selecting section 81 outputs a command or commands indicative of a selected parameter or parameters to the first combustion correction setting section 82.

In response this command or these commands, the first combustion correction setting section 82 sets a correction value or correction values of the selected parameters (e.g., the first fuel injection amount, the ignition timing, the first injection timing. ) selected by the first combustion correction selecting section 81, and outputs the correction value or values to the first injection amount setting section 54, the first injection timing setting section 55, or the ignition timing setting section 56, to correct the combustion status of the primary combustion, that is, to increase the heat generation. In this correction, however, a predetermined allowable range is predetermined for each value. Therefore, when the heat generation cannot be increased sufficiently within the allowable range, the correction is not executed beyond the allowable range.

The operation of the combustion status detecting routine of the ECU 20 of this seventh embodiment will be described hereinbelow with reference to FIG. 28.

In the combustion status detecting routine, in step S601, the control detects the cylinder inner pressure. In step S602, the control calculates the heat generation rate. Further, in step S603, the control discriminates whether the primary combustion of the first injection fuel is normal or not on the basis of the heat generation rate. In this step, the abnormality of the primary combustion by the first injection fuel is discriminated whether the heat generation rate is high enough to fire the second injection fuel at a predetermined crank angular position of the expansion stroke of the primary combustion.

If normal; that is, if a heat quantity large enough to fire the second injection fuel can be obtained by the primary combustion, control proceeds to step S604 to clear (F←0) the combustion status discriminate flag indicative of the normal primary combustion, passing through the routine.

However, if abnormal; that is, if a heat quantity large enough to fire the second injection fuel cannot be obtained by the primary combustion, control proceeds from the step S603 to step S605 to select the parameter or parameters to improve the primary combustion, proceeding to step S606.

In step S606, control sets the correction value or values of the parameter or parameters selected in step S605. Finally, in step S607, control sets the combustion status discriminate flag (F←1) indicative of the abnormal primary combustion, passing through the routine. Further, when the first injection amount and the first injection timing are both not corrected, in the first fuel injection amount setting routine shown in FIG. 24, the correction value is kept at 1 or 0 in step S108 or step S109, without correcting any substantial correction.

In this embodiment, since the combustion status of the primary combustion can be corrected (the heat quantity is increased) when a heat quantity large enough to fire the second injection fuel cannot be obtained by the primary combustion of the first injection fuel under the operating conditions which satisfy the twice fuel injection conditions, it is possible to securely prevent the raw gas from being emitted as it is. Accordingly, the catalyst can be prevented from being overheated, degraded or damaged due to the misfire of the second injection fuel.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A method of activating a catalyst for a direct fuel injection engine, comprising the steps of:

detecting engine operating parameters;

calculating a basic fuel injection amount on the basis of the detected engine operating conditions;

checking whether n-time fuel injection is needed or not;

setting a first fuel injection amount by correcting the basic fuel injection amount on the basis of various engine operating conditions and further setting a first fuel injection timing when n-time fuel injection is not needed; and setting a first fuel injection amount, a second fuel injection amount, a third fuel injection amount, in sequence when n-time fuel injection is needed; and further setting a first injection timing, a second fuel injection timing, a third fuel injection timing in sequence.

2. The catalyst activation control system for a direct fuel injection engine for spark-igniting primary fuel directly injected into each cylinder so as to perform the stratification combustion while purifying exhaust gas by a catalyst disposed in an engine exhaust system, wherein an additional fuel is injected at least once into each cylinder succeeding to the primary fuel combustion so as to fire the additional injection fuel by flame propagation of the preceding fuel combustion when the catalyst is inactivated due to the stratification combustion.

3. The catalyst activation control system according to claim 2, wherein any one of the additional fuel injection method and an ignition timing retarding method is selected in accordance with the engine operating conditions.

4. The catalyst activation control system according to claim 2, wherein any one of a method of changing a stratification combustion to a uniform combustion, a method of increasing the first fuel injection amount, and a method of interrupting the additional fuel injection is selectively selected when a quantity of heat generated by the first fuel combustion is too low to fire the additional injection fuel.

5. A method of activating a catalyst for a direct fuel injection spark ignition engine having an injector and a spark plug disposed in a combustion chamber of each cylinder and using stratification combustion and uniform combustion, comprising the steps of:

detecting various engine operating conditions;

performing primary combustion by spark igniting primary fuel directly injected into each cylinder, the amount of fuel being calculated depending on said engine operating conditions; and performing subsidiary combustion by injecting subsidiary fuel into each cylinder during the expansion stroke of said primary combustion so as to fire said subsidiary fuel by flame propagation of said primary combustion without spark-igniting, whereby an exhaust gas temperature can be raised for catalyst activation.

6. The method of activating the catalyst according to claim 5, wherein the subsidiary combustion is performed at a crank angle between 30 and 60 degrees after top dead center.

7. The method of activating the catalyst according to claim 5, further comprising the steps of:

detecting a pressure of each cylinder;

calculating a heat generation rate depending on the detected pressure;

determining whether the calculated heat generation rate is normal or abnormal; and executing the subsidiary fuel injection when the calculated heat generation rate is normal and interrupting the subsidiary fuel injection and correcting a parameter related to the primary combustion when the calculated heat generation rate is abnormal.

8. The method of activating the catalyst according to claim 7, wherein said parameter related to the primary combustion is any one of the primary fuel injection timing, the primary fuel injection amount, and the ignition timing.

9. The method of activating the catalyst according to claim 5, further comprising the steps of:

determining whether said target exhaust gas temperature is higher than a first predetermined value; and selecting to perform subsidiary combustion according to the subsidiary fuel injection to raise the exhaust gas temperature when said target exhaust gas temperature is higher than said first predetermined value and selecting to perform the ignition retard without the subsidiary combustion to raise the exhaust gas temperature when said target exhaust gas temperature is lower than said first predetermined value.

10. The method of activating catalyst according to claim 9, wherein said first predetermined value is 300° C.

11. The method of activating the catalyst according to claim 9, further comprising the steps of:

measuring an exhaust gas temperature;

determining whether the measured exhaust gas temperature reaches said target exhaust gas temperature;

determining whether the subsidiary combustion is selected or the ignition retard is selected to raise the exhaust gas temperature depending on the target exhaust gas temperature; and increasing an amount of the subsidiary fuel injection when the subsidiary combustion is selected and increasing a retard angle of the ignition timing when the ignition retard is selected.

12. The method of activating the catalyst according to claim 9, further comprising the steps of:

determining whether said target exhaust gas temperature is higher than a second predetermined value; and selecting to perform the further combustion by injecting further fuel succeeding to the subsidiary combustion so as to fire the injected fuel by flame propagation of the subsidiary combustion without spark-igniting when said target exhaust gas temperature is higher than said second predetermined value.

13. The method of activating the catalyst according to claim 9, wherein said predetermined value is 400° C.

14. The method of activating the catalyst according to claim 5, further comprising a step of:

discriminating whether the current engine operation requires subsidiary fuel injection for the activation of the catalyst on the basis of the engine operating conditions to permit subsidiary fuel injection.

15. The method of activating the catalyst according to claim 14, wherein subsidiary fuel injection is required when the engine operation is within a predetermined range of stratification combustion where the catalyst is possibly inactivated.

16. The method of activating the catalyst according to claim 15, wherein said predetermined range is where the engine speed and the engine load are both low.

17. A catalyst activation control system for a direct fuel injection into a spark ignition multicylinder engine having a catalyst disposed in an engine exhaust system for said engine, said injection being into a combustion chamber of each cylinder for selectively performing a stratification combustion and uniform combustion, comprising:

engine operating condition detecting means for detecting various engine operating conditions;

primary fuel combustion means for performing a primary combustion by spark-igniting a primary fuel directly injected through an injector into each cylinder depending on said engine operating conditions; and catalyst activating means for injecting a subsidiary fuel into each cylinder during the expansion stroke of the primary fuel combustion so as to fire the subsidiary injection fuel by flame propagation of the primary fuel combustion without spark-igniting whereby an exhaust gas temperature can be raised for catalyst activation.

18. The catalyst activation control system according to claim 1, wherein said primary fuel combustion means comprises:

combustion mode deciding means based on the engine operating conditions detected by said engine operating condition detecting means for deciding the combustion mode on any one of an ordinary uniform combustion for injecting fuel in an early period of an engine intake stroke and a stratification combustion for injecting fuel in a later period of the compression stroke but immediately before fuel spark ignition;

primary fuel injection amount setting means for setting a primary fuel injection amount in accordance with the current engine operating conditions;

primary fuel injection timing setting means for setting a fuel injection timing for said calculated primary fuel injection amount in accordance with the combustion mode and the engine operating conditions;

ignition timing setting means for setting an ignition timing by correcting a basic ignition timing decided by the detected engine operating conditions;

fuel injection timing calculating means for calculating the set fuel injection timing in terms of a crank angular position relative to a reference crank angle, and outputting the calculated fuel injection timing signal to said injector; and ignition timing calculating means for calculating the set fuel ignition timing in terms of a crank angular position relative to the reference crank angle position and for outputting the fuel ignition timing signal to said spark plug.

19. The catalyst activation control system according to claim 18, wherein said primary fuel injection timing setting means decides a fuel injection start timing in the case of the ordinary uniform combustion and a fuel injection end timing in the case of the stratification combustion.

20. The catalyst activation control system according to claim 17, wherein said catalyst activating means comprises:

subsidiary fuel injection discriminating means for discriminating whether the current engine operation requires a plurality of subsidiary injections for the activation of the catalyst on the basis of the engine operating conditions and for outputting a command indicative of plural subsidiary fuel injections;

subsidiary fuel injection amount setting means responsive to the plural subsidiary fuel injection command for setting a plurality of subsidiary fuel injection amounts; and subsidiary fuel injection timing setting means for setting a plurality of fuel injection timings for the respective subsidiary fuel injection amounts so that the subsidiary fuel in each occurrence is fired by the flame propagation of the preceding fuel combustion, a plurality of the set fuel injection timings being applied to said fuel injection timing calculating means.

21. The catalyst activation control system according to claim 20, wherein said subsidiary fuel injection timing setting means adapted to set the injection timing for the first subsidiary fuel between 30 and 60 degrees after a top dead center in the primary fuel combustion, and the injection timing for the second subsidiary fuel between 90 and 120 degrees after top dead center in the fuel combustion of the first subsidiary fuel.

22. The catalyst activation control system according to claim 17, wherein said catalyst activating means further comprising:

subsidiary fuel injection discriminating means for discriminating whether the current engine operation requires the subsidiary fuel injection for the activation of the catalyst on the basis of the engine operating conditions and for outputting a command indicative of the subsidiary fuel injection;

subsidiary fuel injection amount setting means responsive to the subsidiary fuel injection command for setting an injection amount of the subsidiary fuel; and subsidiary fuel injection timing setting means for setting a fuel injection timing for the subsidiary fuel injection amount so that the subsidiary fuel is fired by the flame propagation of the primary fuel combustion, the set subsidiary fuel injection timing being applied to said fuel injection timing calculating means.

23. The catalyst activation control system according to claim 22, wherein said subsidiary combustion discriminating means discriminates that the subsidiary fuel injection is required when the engine operation is within a predetermined range of the stratification combustion where the catalyst is possibly inactivated.

24. The catalyst activation control system according to claim 22, wherein said subsidiary fuel injection amount setting means sets an injection amount of the subsidiary fuel to be fired by the flame propagation of the primary fuel combustion on the basis of the basic fuel amount.

25. The catalyst activation control system according to claim 22, wherein said subsidiary fuel injection timing setting means sets an injection timing for the subsidiary fuel injection amount with reference to a map decided empirically on the basis of the detected engine speed and the engine load represented by the calculated basis fuel injection amount engine operation conditions.

26. The catalyst activation control system according to claim 22, wherein said subsidiary fuel injection timing setting means is adopted to set said subsidiary fuel injection timing between 30 and 60 degrees after a top dead center in the primary fuel combustion.

27. The catalyst activation control system according to claim 22, further comprising:

cylinder pressure detecting means for detecting a cylinder pressure generated by the first fuel combustion;

heat generation rate calculating means for calculating a heat generation rate by the primary fuel combustion on the basis of at least said cylinder pressure;

abnormality discriminating means for discriminating whether the primary fuel combustion is normal or abnormal on the basis of the calculated heat generation rate;

correcting parameter selecting means for selecting at least one parameter related to the primary fuel combustion when said abnormality discriminating means discriminates that the primary fuel combustion is abnormal; and correcting parameter setting section for setting a correction value of the selected parameter so as to increase the heat generation rate by the primary fuel combustion in the succeeding cycle without changing the combustion mode from the stratification combustion to the uniform combustion.

28. The catalyst activation control system according to claim 27, wherein said at last one parameter is any one or a combustion of an increase rate of the primary fuel injection amount, an advance or retard angle of the ignition timing, a displacement of the primary fuel injection timing each being set within a predetermined allowable range.

29. The catalyst activation control system according to claim 27, wherein the subsidiary fuel combustion is interrupted in the same cycle when said abnormality discriminating means discriminates that the primary fuel combustion is abnormal.

30. The catalyst activation control system according to claim 22, further comprising:

cylinder pressure detecting means for detecting a cylinder pressure generated by the primary fuel combustion;

heat generation rate calculating means for calculating a heat generation rate by the primary fuel combustion on the basis of at least said cylinder pressure;

abnormality discriminating means for discriminating whether the primary fuel combustion is normal or abnormal on the basis of the calculated heat generation rate; and combustion mode changing means for changing the stratification combustion to the uniform combustion when said abnormality discriminating means discriminates that the primary fuel combustion is abnormal.

31. The catalyst activation control system according to claim 30, wherein said heat generation calculating means calculates the heat generation rate on the basis of a pressure-stroke diagram obtained by setting various engine operating conditions as parameters.

32. The catalyst activation control system according to claim 30, wherein said abnormality discriminating means decides the abnormality when the generated heat is lower than a predetermined value with reference to a heat generation diagram obtained for each engine cycle.

33. The catalyst activation control system according to claim 30, wherein said abnormality discriminating means decides the abnormality when the heat generation rate at a predetermined crank angular position in the expansion stroke according to the primary fuel combustion is lower than a reference heat quantity large enough to fire the second injection fuel.

34. The catalyst activation control system according to claim 30, further comprising:

alarm generating means for generating an alarm to a driver in case of abnormality.

35. The catalyst activation control system according to claim 22, further comprising:

target exhaust gas temperature setting means for setting a target exhaust gas temperature when said subsidiary fuel injection discriminating means discriminates that the engine operation requires the subsidiary fuel injection to activate the catalyst;

temperature raising method selecting means for selecting one of a subsidiary fuel injection method and an ignition timing retard method in accordance with the set target exhaust gas temperature; and ignition timing retarding means for retarding the ignition timing set by said ignition timing setting means without the subsidiary fuel injection when said temperature raising method selecting means selects the ignition timing retard method.

36. The catalyst activation control system according to claim 35, wherein said target exhaust gas temperature setting means sets the target exhaust gas temperature on the basis of catalyst characteristics and the engine operating conditions.

37. The catalyst activation control system according to claim 35, wherein said temperature raising method selecting means selects the ignition timing retard method when the set target exhaust gas temperature is about 300° C. and but the twice fuel injection method when the set target exhaust gas temperature is 300° C. or higher.

38. The catalyst activation control system according to claim 35, wherein an ignition timing retard rate is determined with reference to a map decided on the basis of engine speed and the basic fuel injection amount when the ignition retard method is selected.

39. The catalyst activation control system according to claim 35, further comprising:

an exhaust gas temperature sender; and comparing means for comparing the target exhaust gas temperature set by said target exhaust gas temperature setting means with an actual exhaust gas temperature detected by said exhaust gas sensor to produce a difference; wherein said subsidiary fuel injection amount setting means adjusts the set subsidiary fuel injection amount based on said difference when said temperature raising method selecting means selects the subsidiary fuel injection method, and said ignition timing retarding means adjusts the ignition timing retard rate based on said difference when said temperature raising method selecting means selects the ignition timing retard method.

40. The catalyst activation control system according to claim 35, further comprising:

an exhaust gas temperature sensor;

catalyst activation discriminating means for discriminating whether an actual temperature detected by said exhaust gas temperature sensor reaches said target exhaust gas temperature;

further fuel injection amount setting means for setting an amount of the further fuel injection succeeding to said subsidiary fuel injection when said target exhaust gas temperature is set in a predetermined range; and further fuel injection timing setting means for setting an injection timing for said further fuel injection amount to be fired by the flame propagation of the subsidiary combustion.

41. The catalyst activation control system according to claim 40, wherein the thrice fuel combustion is selected when the set target exhaust gas temperature is 400° C. or higher at cool engine start; the twice fuel combustion is selected when the set target exhaust gas temperature is between 300° C. and 400° C.; the ignition timing retard is selected when the set target exhaust gas temperature is 300° C. or lower.

* * * * *